US012620096B2

(12) United States Patent
Patzoldt et al.

(10) Patent No.: US 12,620,096 B2
(45) Date of Patent: *May 5, 2026

(54) CROP YIELD COMPONENT MAP

(71) Applicant: Deere & Company, Moline, IL (US)

(72) Inventors: William Louis Patzoldt, Gilroy, CA (US); Lee Kamp Redden, Palo Alto, CA (US); John Chadwick Yagow, Mansfield, IL (US)

(73) Assignee: Deere & Company, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/781,072

(22) Filed: Jul. 23, 2024

(65) Prior Publication Data

US 2024/0394878 A1      Nov. 28, 2024

Related U.S. Application Data

(63) Continuation of application No. 17/583,110, filed on Jan. 24, 2022, now Pat. No. 12,067,718.

(Continued)

(51) Int. Cl.
G06T 7/00 (2017.01)
A01B 79/00 (2006.01)
(Continued)

(52) U.S. Cl.
CPC .......... G06T 7/0012 (2013.01); A01B 79/005 (2013.01); G06Q 50/02 (2013.01);
(Continued)

(58) Field of Classification Search
CPC .................. G06T 7/0012; G06T 11/00; G06T 2207/30108; G06T 2207/30188;
(Continued)

(56) References Cited

U.S. PATENT DOCUMENTS 5,220,876 A * 6/1993 Monson ............... A01C 21/005
706/904
6,393,927 B1 * 5/2002 Biggs ................... A01C 21/007
73/866

(Continued)

OTHER PUBLICATIONS

Deere & Company, "Cotton pickers document and map cotton yields with Harvest Doc™," Jul. 23, 2013, three pages, [Online] [Retrieved on Sep. 29, 2022] Retrieved from the Internet <URL: http://salesmanual.deere.com/sales/salesmanual/en_NA/ams/2011/feature/greenstar3/harvest_cotton2.html>.

(Continued)

*Primary Examiner* — Timothy R Newlin
(74) *Attorney, Agent, or Firm* — Fenwick & West LLP

(57) ABSTRACT

Embodiments relate to a system that generates a crop yield component map for a field. The system determines amounts of nitrogen applied to each portion of the field by a set of nitrogen applicator farming machines. The system accesses crop yield data associated with a crop that was grown in the field. The crop yield data was generated by a set of harvester farming machines that travelled through the field and harvested plant parts of the crop. The system determines, by analyzing the crop yield data, plant part metrics for the harvested plant parts in each field portion. The system generates a crop yield component map that maps, for each field portion, a plant part metric associated with the field portion and an amount of nitrogen applied to the field portion. The component map may then be provided for display.

16 Claims, 12 Drawing Sheets

Farming Machine
100

Related U.S. Application Data

(60) Provisional application No. 63/294,050, filed on Dec. 27, 2021.

(51) Int. Cl.
*G06Q 50/02* (2012.01)
*G06T 11/00* (2006.01)

(52) U.S. Cl.
CPC .... *G06T 11/00* (2013.01); *G06T 2207/30108* (2013.01); *G06T 2207/30188* (2013.01)

(58) Field of Classification Search
CPC .... A01B 79/005; G06Q 50/02; A01C 21/007; A01C 21/005; A01D 41/127
See application file for complete search history.

(56) References Cited

U.S. PATENT DOCUMENTS

| | | | | |
|---|---|---|---|---|
| 9,652,840 | B1 * | 5/2017 | Shriver | G01N 33/24 |
| 10,345,283 | B1 * | 7/2019 | Laird | C05C 11/00 |
| 11,930,733 | B1 * | 3/2024 | Fridgen | G06N 3/0455 |
| 2001/0036295 | A1 * | 11/2001 | Hendrickson | G06T 7/0004 |
| | | | | 382/110 |
| 2004/0194442 | A1 * | 10/2004 | Maertens | A01D 41/127 |
| | | | | 56/10.2 R |
| 2008/0304711 | A1 * | 12/2008 | Scharf | A01C 21/007 |
| | | | | 382/110 |
| 2009/0007485 | A1 * | 1/2009 | Holland | A01C 21/007 |
| | | | | 47/58.1 R |
| 2011/0246915 | A1 * | 10/2011 | Nara | A01C 21/007 |
| | | | | 715/764 |
| 2012/0083907 | A1 * | 4/2012 | Motavalli | G06Q 10/0631 |
| | | | | 700/90 |
| 2014/0230391 | A1 * | 8/2014 | Hendrickson | G01N 33/0098 |
| | | | | 702/2 |
| 2015/0242970 | A1 * | 8/2015 | Avey | G06Q 50/163 |
| | | | | 705/314 |
| 2015/0254800 | A1 * | 9/2015 | Johnson | G06V 20/188 |
| | | | | 382/141 |
| 2016/0084813 | A1 * | 3/2016 | Anderson | G01N 33/025 |
| | | | | 702/5 |
| 2016/0180473 | A1 * | 6/2016 | Groeneveld | A01C 21/00 |
| | | | | 705/7.25 |
| 2017/0016870 | A1 * | 1/2017 | McPeek | G01N 33/025 |
| 2017/0228475 | A1 * | 8/2017 | Aldor-Noiman | G06V 10/7715 |
| 2017/0303465 | A1 * | 10/2017 | Koch | G09B 29/007 |
| 2018/0181893 | A1 * | 6/2018 | Basso | G06Q 50/02 |
| 2018/0271015 | A1 * | 9/2018 | Redden | G06N 3/0499 |
| 2018/0338422 | A1 * | 11/2018 | Brubaker | A01D 41/1208 |
| 2019/0050948 | A1 * | 2/2019 | Perry | G06Q 30/02 |
| 2019/0059203 | A1 * | 2/2019 | Staples | A01C 21/007 |
| 2019/0075727 | A1 * | 3/2019 | Duke | G01N 33/02 |
| 2019/0116725 | A1 * | 4/2019 | Hanya | A01C 21/007 |
| 2019/0335674 | A1 * | 11/2019 | Basso | A01G 22/00 |
| 2020/0045898 | A1 * | 2/2020 | Arriaza | A01C 21/007 |
| 2020/0068797 | A1 * | 3/2020 | Folle | G01N 33/24 |
| 2020/0077582 | A1 * | 3/2020 | Xu | A01F 7/06 |
| 2020/0097851 | A1 * | 3/2020 | Alvarez | G06F 16/242 |
| 2020/0126232 | A1 * | 4/2020 | Guo | G06T 7/0016 |
| 2020/0202596 | A1 * | 6/2020 | Kitahara | G06T 7/0012 |
| 2021/0243936 | A1 * | 8/2021 | Vandike | G05D 1/0278 |
| 2022/0383211 | A1 * | 12/2022 | Kojima | G06Q 50/02 |
| 2023/0309439 | A1 * | 10/2023 | Yarimizu | G06T 7/0014 |
| 2023/0320249 | A1 * | 10/2023 | Vandike | A01D 41/127 |
| | | | | 701/50 |
| 2023/0385959 | A1 * | 11/2023 | Aune | G06Q 10/06393 |

OTHER PUBLICATIONS

Extended European Search Report and Written Opinion issued in European Patent Application No. 22208558.1, dated May 15, 2023, in 10 pages.

youtube.com, "John Deere Operations Center Field Analyzer," Farmer's Supply Sales, Inc., Dec. 20, 2016, one pages, [Online] [Retrieved on Sep. 29, 2022] Retrieved from the Internet <URL: https://www.youtube.com/watch?v=qjUxwVRsHOc>.

United States Office Action, U.S. Appl. No. 17/583,110, Jan. 3, 2024, 15 pages.

\* cited by examiner

Field 300

Route 330

Field Portions 320

First Nitrogen Applicator 310

600

Determine amounts of nitrogen applied to each field portion
605

Access crop yield data of a crop grown in the field
610

Determine plant part metrics for each field portion by analyzing the crop yield data
615

Generate a crop yield component map
620

Provide the crop yield component map for display
625

CROP YIELD COMPONENT MAP

CROSS-REFERENCE TO RELATED APPLICATION

This application is a continuation of U.S. application Ser. No. 17/583,110, filed Jan. 24, 2022, now U.S. Pat. No. 12,067,718, which claims the benefit of priority to U.S. Provisional Patent Application No. 63/294,050, "Crop Yield Component Map," filed on Dec. 27, 2021, each of which is incorporated by reference in its entirety.

BACKGROUND

Field of Disclosure

This disclosure relates to applying nitrogen to portions of a farming field, and, more specifically, to generating and using a crop yield component map to determine amounts of nitrogen to apply to the field.

Description of the Related Art

Growing and cultivating a crop in a farming field typically includes applying nitrogen (e.g., in fertilizer) to the field. This can help plants grow faster and produce more crops. The nitrogen is typically applied once during an agricultural cycle. It is also typically applied equally across a field. However, nitrogen is expensive and can account for a significant portion of the expenditures for growing a crop. Thus, applying nitrogen equally across the field may be an inefficient use of the nitrogen and other resources.

SUMMARY

To increase the efficiency of nitrogen usage for an agricultural cycle, a system generates a crop yield component map based on data from a past agricultural cycle. To generate the component map, the system determines amounts of nitrogen applied to each portion of a field by a set of nitrogen applicator farming machines during a first time period. The system also accesses crop yield data associated with a crop that was grown in the field during the past agricultural cycle. The crop yield data was generated by a set of harvester farming machines that travelled through the field and harvested plant parts of the crop during a second time period subsequent to the first time period.

The system determines, by analyzing the crop yield data, metrics for the plant parts that were harvested in each field portion. For example, the system determines metrics that may include the sizes of the plant parts, the weights of the plant parts, and the total number of plant parts harvested from each field portion. Using the nitrogen amounts and the plant part metrics, the system generates a crop yield component map that maps, for each field portion, one or more plant part metrics associated with the field portion and an amount of nitrogen applied to the field portion.

The crop yield component map allows an agricultural manager of the field to compare, for each field portion, plant part metrics with the amounts of nitrogen applied. This allows the manager to better understand the agricultural cycle for the harvested crop. It also allows the manager to make informed farming decisions for subsequent agricultural cycles.

In some embodiments, nitrogen is applied multiple times during the first time period to promote additional growth. For example, a set of farming machines apply nitrogen during a first sub-time period (e.g., before the seed is planted) and apply addition nitrogen at a second sub-time period (e.g., after the crop has sprouted). In these embodiments, the system may determine the amounts of nitrogen applied during each of the sub-time periods, and the crop yield component map may map the amounts of nitrogen applied during each of these sub-time periods. This allows the agricultural manager to determine how much nitrogen was applied during each sub-time period (instead of just the total amount of nitrogen applied).

Applying nitrogen at different phases of the agricultural cycle may influence plant part metrics of the crop differently. For example, a first plant part metric may be strongly influenced by the amount of nitrogen applied during the first sub-time period and different plant part metric may be strongly influenced by the amount of nitrogen applied during the second sub-time period. To give a more specific example, if the crop is corn, the number of kernels on a cob may be influenced by the amount of nitrogen applied during the first sub-time period and the size and weight of each kernel on a cob may be influenced by the amount of nitrogen applied during the second sub-time period. Thus, if the crop yield component map maps the amounts of nitrogen applied during each of these sub-time periods, the agricultural manager can better understand the influence of nitrogen on different plant part metrics and can apply nitrogen more intentionally and efficiently during future agricultural cycles.

For brevity, this disclosure describes the application of nitrogen. However, embodiments described herein may be applicable to other applied substances, such as growth promoters and growth regulators. Embodiments described herein may also be applicable to other agricultural considerations, such as planting density. For example, an agricultural manager may better understand the influence of planting density (e.g., the number of seeds planted per acre) on different plant part metrics.

Figure 1A:
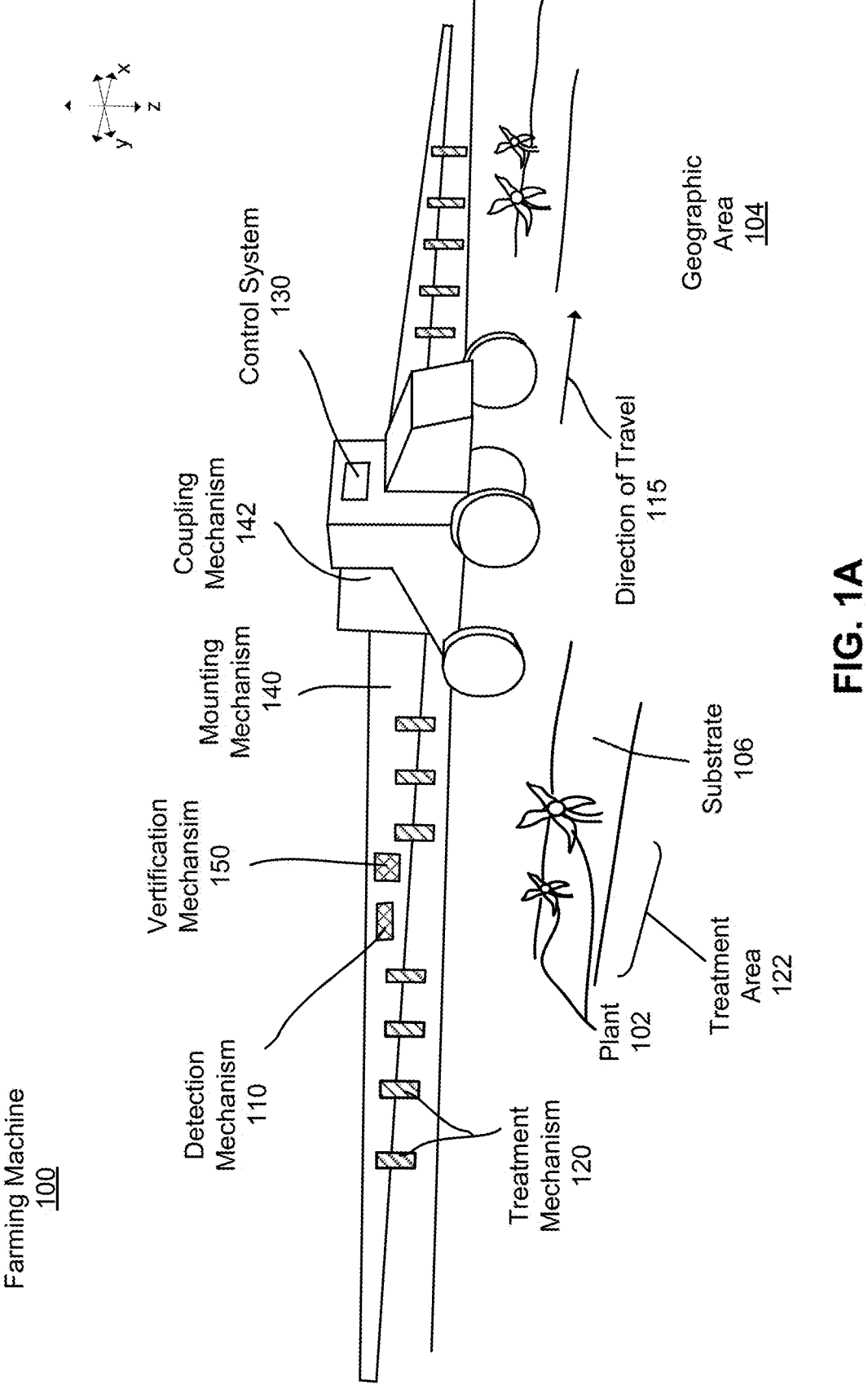
FIG. 1A illustrates an isometric view of a farming machine, in accordance with a first example embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

I. Introduction

Embodiments relate to a system that generates a crop yield component map for a field based on data from a past agricultural cycle. The crop yield component map maps, for each portion of the field, plant part metrics associated with the portion and the amount of nitrogen applied to the portion. Before describing further details of the component map, FIGS. 1-2 describe example farming machines.

II. Field Management and Treatment Plans

Agricultural managers ("managers") are responsible for managing farming operations in one or more fields. Managers work to implement a farming objective within those fields and select from among a variety of farming actions to implement that farming objective. Traditionally, managers are a farmer or agronomist that works the field but could also be other systems configured to manage farming operations within the field. For example, a manager could be an automated farming machine (e.g., farming machine 100 below), a machine learned computer model, etc. In some cases, a manager may be a combination of the managers described above. For example, a manager may include a farmer assisted by a machine learned agronomy model and one or more automated farming machine or could be a farmer and an agronomist working in tandem.

Managers implement one or more farming objectives for a field. A farming objective is a macro-level goal for a field. For example, macro-centric farming objectives may include treating crops with growth promotors, neutralizing weeds with growth regulators, harvesting a crop with the best possible crop yield, or any other suitable farming objective. However, farming objectives may also be a more micro level goal for the field. For example, micro-centric farming objectives may include treating a particular plant in the field, repairing or correcting a part of a farming machine, requesting feedback from a manager, etc. Of course, there are many possible farming objectives, and the aforementioned examples are not intended to be limiting.

Faming objectives may be accomplished by one or more farming machines performing a series of farming actions. Farming machines are described in greater detail below. Farming actions are any operation implementable by a farming machine within the field that works towards a farming objective. Consider, for example, the farming objective of harvesting a crop with the best possible yield. This farming objective requires a litany of farming actions, e.g., planting the field, fertilizing the plants, watering the plants, weeding the field, harvesting the plants, evaluating yield, etc. Similarly, each farming action pertaining to harvesting the crop may be a farming objective in and of itself. For instance, planting the field can require its own set of farming actions, e.g., preparing the soil, digging in the soil, planting a seed, etc.

In other words, managers accomplish a farming objective by implementing a treatment plan in the field. A treatment plan is a hierarchical set of macro-centric and/or micro-centric objectives that accomplish the farming objective of the manager. Within a treatment plan, each macro or micro-objective may require a set of farming actions to accomplish, or each macro or micro-objective may be a farming action itself.

A treatment plan is generally a temporally sequenced set of farming actions to apply to the field that the manager expects will accomplish the faming objective. A result is a representation as to whether, or how well, a farming machine accomplished a farming objective. A result may be a qualitative measure such as "accomplished" or "not accomplished," or may be a quantitative measure such as "40 pounds harvested," or "1.25 acres treated." Results can be positive or negative, depending on the configuration of the farming machine or implemented treatment plan. Moreover, results can be measured by sensors of the farming machine, input by managers, or accessed from a datastore or a network.

III. Farming Machine

Overview

A farming machine that implements farming actions of a treatment plan may have a variety of configurations, some of which are described in greater detail below.

Figure 1B:
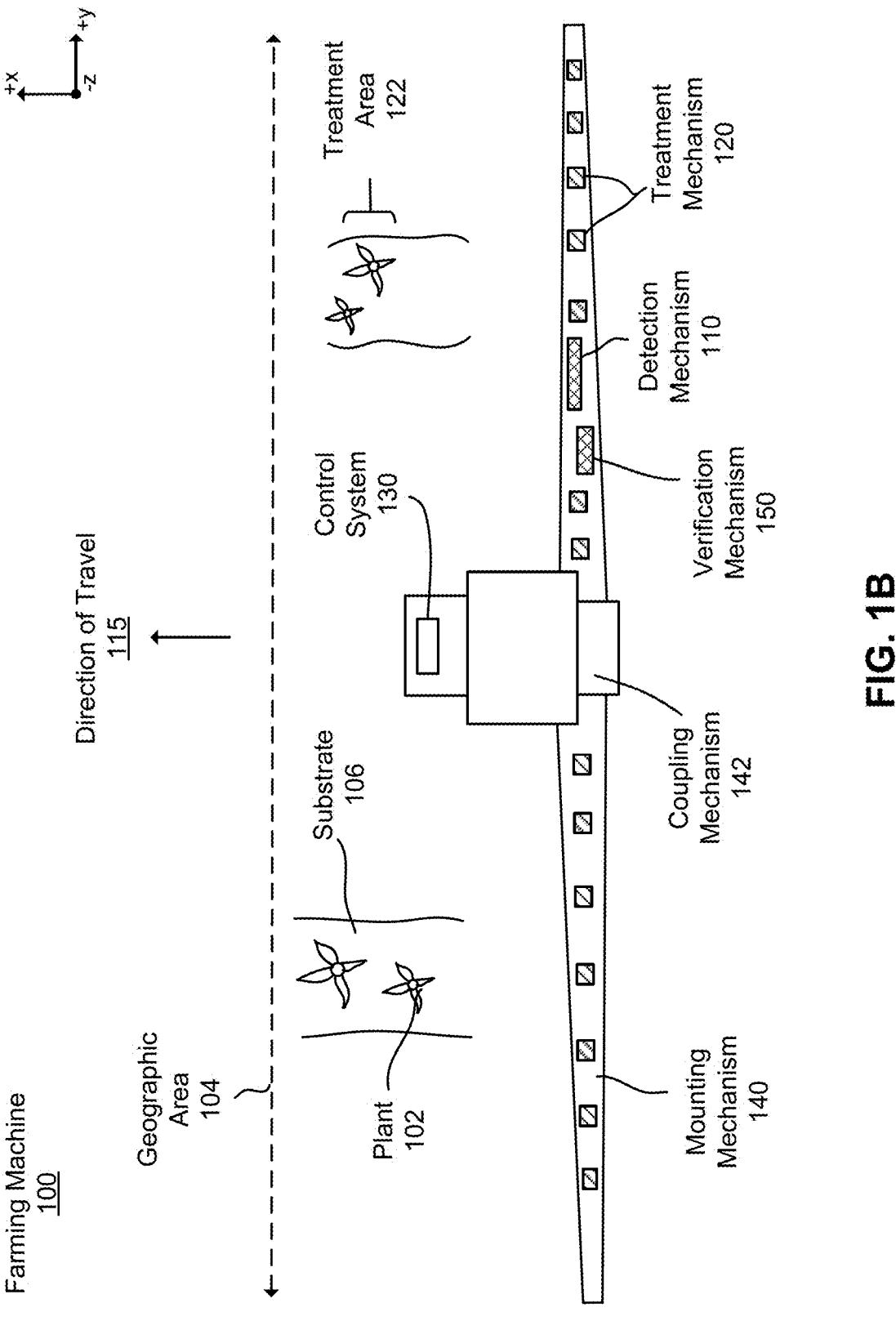
FIG. 1B illustrates a top view of a farming machine, in accordance with the first embodiment.
Figure 1C:
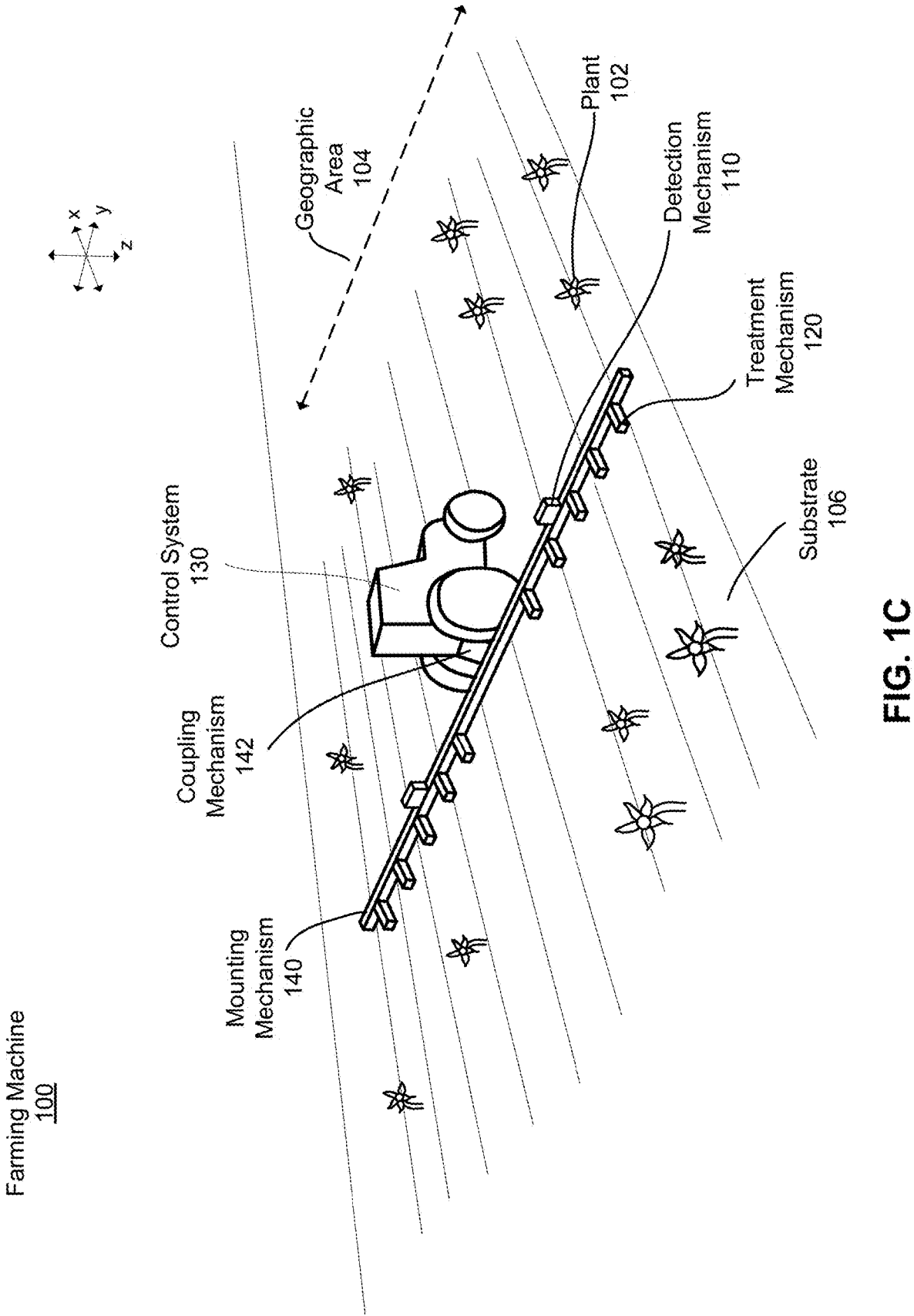
FIG. 1C illustrates an isometric view of a farming machine, in accordance with a second example embodiment.

FIG. 1A is an isometric view of a farming machine 100 that performs farming actions of a treatment plan, according to one example embodiment, and FIG. 1B is a top view of the farming machine 100 in FIG. 1A. FIG. 1C is an isometric view of another farming machine 100 that performs actions of a treatment plan, in accordance with one example embodiment.

The farming machine 100 includes a detection mechanism 110, a treatment mechanism 120, and a control system 130. The farming machine 100 can additionally include a mounting mechanism 140, a verification mechanism 150, a power source, digital memory, communication apparatus, or any other suitable component that enables the farming machine 100 to implement farming actions in a treatment plan. The farming machine 100 can include additional or fewer components than described herein. Furthermore, the described components and functions of the farming machine 100 are just examples, and a farming machine 100 can have different or additional components and functions other than those described below.

The farming machine 100 is configured to perform farming actions in a field, and the implemented farming actions are part of a treatment plan. To illustrate, the farming machine 100 implements a farming action which applies a treatment to one or more plants 102, the ground, or the substrate 106 within a geographic area. Here, the treatment farming actions are included in a treatment plan to regulate plant growth. As such, treatments are typically applied directly to a single plant 102, but can alternatively be directly applied to multiple plants, indirectly applied to one or more plants, applied to the environment associated with the plant (e.g., soil, atmosphere, or other suitable portion of the plant environment adjacent to or connected by an environmental factor, such as wind), or otherwise applied to the plants.

In a particular example, the farming machine 100 is configured to implement a farming action which applies a treatment that necroses the plant (e.g., weeding) or part of the plant (e.g., pruning). In this case, the farming action can include dislodging the plant from the supporting substrate 106, incinerating a portion of the plant (e.g., with an electromagnetic wave such as a laser), applying a treatment concentration of working fluid (e.g., fertilizer, hormone, water, etc.) to the plant, or treating the plant in any other suitable manner.

In another particular example, the farming machine 100 is configured to implement a farming action which applies a treatment to regulate plant growth. Regulating plant growth can include promoting plant growth, promoting growth of a plant portion, hindering (e.g., retarding) plant or plant portion growth, or otherwise controlling plant growth. Examples of regulating plant growth includes applying growth hormone to the plant, applying fertilizer to the plant or substrate, applying a disease treatment or insect treatment to the plant, electrically stimulating the plant, watering the plant, pruning the plant, or otherwise treating the plant. Plant growth can additionally be regulated by pruning, necrosing, or otherwise treating the plants adjacent to the plant.

Operating Environment

The farming machine 100 operates in an operating environment. The operating environment is the environment surrounding the farming machine 100 while it implements farming actions of a treatment plan. The operating environment also includes the farming machine 100 and its corresponding components.

The operating environment may include a field. As such, the farming machine 100 implements farming actions of the treatment plan in the field. A field is a geographic area where the farming machine 100 implements a treatment plan. The field may be an outdoor plant field but could also be an indoor location that house plants such as, e.g., a greenhouse, a laboratory, a grow house, a set of containers, or any other suitable environment.

The field may include any number of field portions. A field portion is a subunit of a field. For example, a field portion may be a portion of the field small enough include a single plant, large enough to include many plants, or some other size. The farming machine 100 can execute different farming actions for different field portions. For example, the farming machine 100 may apply an herbicide for some field portions in the field, while applying a pesticide in another field portion. Moreover, a field and a field portion are largely interchangeable in the context of the methods and systems described herein. That is, treatment plans and their corresponding farming actions may be applied to an entire field or a field portion depending on the circumstances at play.

Depending on the application, the boundaries of the field portions may be determined by an agricultural manager, for example, based on the shape and size of the field. In some embodiments, the boundaries of the portions depend on the size of the farming machine, the speed of the machine as it moves through the field, how often the farming machine performs farming actions, and how often the farming machine generates farming action data. For example, if a header of a harvester farming machine is 30-45 feet wide and it generates crop yield data every 5-10 feet, then the field portions may be 30-45 feet wide and 5-10 feet long.

The operating environment may also include plants. As such, farming actions the farming machine 100 implements as part of a treatment plan may be applied to plants in the field. The plants can be crops but could also be weeds or any other suitable plant. Some example crops include cotton, lettuce, soybeans, rice, carrots, tomatoes, corn, broccoli, cabbage, potatoes, wheat, or any other suitable commercial crop. The weeds may be grasses, broadleaf weeds, thistles, or any other suitable determinantal weed.

More generally, plants 102 may include a stem that is arranged superior to (e.g., above) the substrate 106 and a root system joined to the stem that is located inferior to the substrate plane (e.g., below ground). The stem may support any branches, leaves, and/or fruits. The plant can have a single stem, leaf, or fruit, multiple stems, leaves, or fruits, or any number of stems, leaves or fruits. The root system may be a tap root system or fibrous root system, and the root system may support the plant position and absorb nutrients and water from the substrate 106. In various examples, the plant may be a vascular plant, non-vascular plant, ligneous plant, herbaceous plant, or be any suitable type of plant.

Plants in a field may be grown in one or more plant rows (e.g., plant beds). The plant rows are typically parallel but do not have to be. Each plant row is generally spaced between 2 inches and 45 inches apart when measured in a perpendicular direction from an axis representing the plant row. Plant rows can have wider or narrower spacings or could have variable spacing between multiple rows (e.g., a spacing of 12 in. between a first and a second row, a 16 in. spacing between a second and a third row, etc.).

Plants 102 within a field may include the same type of crop (e.g., same genus, same species, etc.). For example, each field portion in a field may include corn crops. However, the plants within each field may also include multiple crops (e.g., a first, a second crop, etc.). For example, some field portions in a field may include lettuce crops while others include pig weeds, or, in another example, some field portions in a field may include beans while others include corn. Additionally, a single field portion may include different types of crop. For example, a single field portion may include a soybean plant and a grass weed.

The operating environment may also include a substrate. As such, farming actions the farming machine 100 implements as part of a treatment plan may be applied to the substrate. The substrate 106 may be soil but can alternatively be a sponge or any other suitable substrate. The substrate may include plants or may not include plants depending on its location in the field. For example, a portion of the substrate may include a row of crops, while the portion of the substrate between crop rows includes no plants.

IV.A Example Machine Configurations

Detection Mechanism(s)

The farming machine 100 may include a detection mechanism 110. The detection mechanism 110 identifies objects in the operating environment of the farming machine 100. To do so, the detection mechanism 110 obtains information describing the environment (e.g., sensor or image data), and processes that information to identify pertinent objects (e.g., plants, substrate, persons, etc.) in its surrounding environment. Identifying objects in the environment further enables the farming machine 100 to implement farming actions in the field. For example, the detection mechanism 110 may capture an image of the field and process the image with a plant identification model to identify plants in the captured image. The farming machine 100 then implements farming actions in the field based on the plants identified in the image.

There farming machine 100 can include any number or type of detection mechanism 110 that may aid in determining and implementing farming actions. In some embodiments, the detection mechanism 110 includes one or more sensors. For example, the detection mechanism 110 can include a multispectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, or any other suitable sensor. Further, the detection mechanism 110 may include an array of sensors (e.g., an array of cameras) configured to capture information about the environment surrounding the farming machine 100. For example, the detection mechanism 110 may include an array of cameras configured to capture an array of pictures representing the environment surrounding the farming machine 100. The detection mechanism 110 may also be a sensor that measures a state of the farming machine. For example, the detection mechanism may be a speed sensor, a heat sensor, or some other sensor that can monitor the state of a component of the farming machine. Additionally, the detection mechanism 110 may also be a sensor that measures components during implementation of a farming action. For example, the detection mechanism 110 may be a flow rate monitor, a grain harvesting sensor, a mechanical stress sensor etc. Whatever the case, the detection mechanism senses information about the operating environment.

A detection mechanism 110 may be mounted at any point on the mounting mechanism 140. Depending on where the detection mechanism 110 is mounted relative to the treatment mechanism 120, one or the other may pass over a geographic area 104 in the field before the other. For example, the detection mechanism 110 may be positioned on the mounting mechanism 140 such that it traverses over a geographic area 104 before the treatment mechanism 120 as the farming machine 100 moves through the field. In another examples, the detection mechanism 110 is positioned to the mounting mechanism 140 such that the two traverse over a geographic location at substantially the same time as the farming machine 100 moves through the filed. Similarly, the detection mechanism 110 may be positioned on the mounting mechanism 140 such that the treatment mechanism 120 traverses over a geographic location before the detection mechanism 110 as the farming machine 100 moves through the field. The detection mechanism 110 may be statically mounted to the mounting mechanism 140, or may be removably coupled to the mounting mechanism 140. In other examples, the detection mechanism 110 may be mounted to some other surface of the farming machine 100 or may be incorporated into another component of the farming machine 100.

Verification Mechanism(s)

The farming machine 100 may include a verification mechanism 150. Generally, the verification mechanism 150 records a measurement of the operating environment and the farming machine 100 may use the recorded measurement to verify or determine the extent of an implemented farming action.

To illustrate, consider an example where a farming machine 100 implements a farming action based on a measurement of that environment by the detection mechanism 110. The verification mechanism 150 records a measurement of the same geographic area measured by the detection mechanism 110 and where farming machine 100 implemented the determined farming action. The farming machine 100 then processes the recorded measurement to determine the extent of the farming action. For example, the verification mechanism 150 may record an image of the geographic region surrounding a plant identified by the detection mechanism 110 and treated by a treatment mechanism 120. The farming machine 100 may apply a treatment detection algorithm to the recorded image to determine the extent of the treatment applied to the plant.

Information recorded by the verification mechanism 150 can also be used to empirically determine operation parameters of the farming machine 100 (e.g., calibrate) that will obtain the desired effects of implemented farming actions. For instance, the farming machine 100 may apply a calibration detection algorithm to a measurement recorded by the farming machine 100. In this case, the farming machine 100 determines whether the actual effects of an implemented farming action are the same as its intended effects. If the effects of the implemented farming action are different than its intended effects, the farming machine 100 may perform a calibration process. The calibration process changes operation parameters of the farming machine 100 such that effects of future implemented farming actions are the same as their intended effects. To illustrate, consider the previous example where the farming machine 100 recorded an image of a treated plant. There, the farming machine 100 may apply a calibration algorithm to the recorded image to determine whether the treatment is appropriately calibrated (e.g., at its intended location in the operating environment). If the farming machine 100 determines that the farming machine is not calibrated (e.g., the applied treatment is at an incorrect location), the farming machine 100 may calibrate itself such that future treatments are in the correct location. Other example calibrations are also possible.

The verification mechanism 150 can have various configurations. For example, the verification mechanism 150 can be substantially similar (e.g., be the same type of mechanism as) the detection mechanism 110 or can be different from the detection mechanism 110. In some cases, the detection mechanism 110 and the verification mechanism 150 may be one in the same (e.g., the same sensor). In an example configuration, the verification mechanism 150 is positioned distal the detection mechanism 110 relative the direction of travel, and the treatment mechanism 120 is positioned there between. In this configuration, the verification mechanism 150 traverses over a geographic location in the operating environment after the treatment mechanism 120 and the detection mechanism 110. However, the mounting mechanism 140 can retain the relative positions of the system components in any other suitable configuration. In some configurations, the verification mechanism 150 can be included in other components of the farming machine 100.

There farming machine 100 can include any number or type of verification mechanism 150. In some embodiments, the verification mechanism 150 includes one or more sensors. For example, the verification mechanism 150 can include a multispectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, or any other suitable sensor. Further, the verification mechanism 150 may include an array of sensors (e.g., an array of cameras) configured to capture information about the environment surrounding the farming machine 100. For example, the verification mechanism 150 may include an array of cameras configured to capture an array of pictures representing the operating environment.

Treatment Mechanism(s)

The farming machine 100 may include a treatment mechanism 120. The treatment mechanism can implement farming actions in the operating environment of a farming machine. For instance, a farming machine may include a treatment mechanism 120 that applies a treatment to a plant, a substrate, or some other object in the operating environment. More generally, the farming machine 100 employs the treatment mechanism 120 to apply a treatment to a treatment area 122, and the treatment area 122 may include anything within the operating environment. That is, the treatment area 122 may be any portion of the operating environment.

When the treatment is a plant treatment, the treatment mechanism 120 applies a treatment to a plant in the field. The treatment mechanism 120 may apply treatments to identified plants or non-identified plants. For example, the farming machine 100 may identify and treat a specific plant in the field. Alternatively, or additionally, the farming machine 100 may identify some other trigger that indicates a plant treatment and the treatment mechanism 120 may apply a plant treatment. Some example plant treatment mechanisms include: one or more spray nozzles, one or more electromagnetic energy sources, one or more physical implements configured to manipulate plants, but other plant treatment mechanisms are also possible.

Additionally, when the treatment is a plant treatment, the effect of treating a plant with a treatment mechanism may include any of plant necrosis, plant growth stimulation, plant portion necrosis or removal, plant portion growth stimulation, or any other suitable treatment effect. Moreover, the treatment mechanism can apply a treatment that dislodges a plant from the substrate, severs a plant or portion of a plant (e.g., cutting), incinerates a plant or portion of a plant, electrically stimulates a plant or portion of a plant, fertilizes or promotes growth (e.g., with a growth hormone) of a plant, waters a plant, applies light or some other radiation to a plant, and/or injects one or more working fluids into the substrate 106 adjacent to a plant (e.g., within a threshold distance from the plant). Other plant treatments are also possible. When applying a plant treatment, the treatment mechanisms 120 may be configured to spray one or more of: an herbicide, a fungicide, insecticide, some other pesticide, or water.

When the treatment is a substrate treatment, the treatment mechanism applies a treatment to some portion of the substrate in the field. The treatment mechanism 120 may apply treatments to identified areas of the substrate, or non-identified areas of the substrate. For example, the farming machine 100 may identify and treat an area of substrate in the field. Alternatively, or additionally, the farming machine 100 may identify some other trigger that indicates a substrate treatment and the treatment mechanism 120 may apply a treatment to the substrate. Some example treatment mechanisms configured for applying treatments to the substrate include: one or more spray nozzles, one or more electromagnetic energy sources, one or more physical implements configured to manipulate plants, but other plant treatment mechanisms are also possible.

Of course, the farming machine 100 is not limited to treatment mechanisms for plants and substrates in the field. The farming machine 100 may include treatment mechanisms for applying various other treatments to objects in the field. Some other example treatment mechanisms may include: components for applying nitrogen to the field and harvesting plant parts from crop plants growing in the field.

Depending on the configuration, the farming machine 100 may include various numbers of treatment mechanisms 120 (e.g., 1, 2, 5, 20, 60, etc.). A treatment mechanism 120 may be fixed (e.g., statically coupled) to the mounting mechanism 140 or attached to the farming machine 100. Alternatively, or additionally, a treatment mechanism 120 may movable (e.g., translatable, rotatable, etc.) on the farming machine 100. In one configuration, the farming machine 100 includes a single treatment mechanism 120. In this case, the treatment mechanism 120 may be actuatable to align the treatment mechanism 120 to a treatment area 122. In a second variation, the farming machine 100 includes a treatment mechanism assembly comprising an array of treatment mechanisms. In this configuration, a treatment mechanism 120 may be a single treatment mechanism 120, a combination of treatment mechanisms 120, or the treatment mechanism assembly. Thus, either a single treatment mechanism, a combination of treatment mechanisms, or the entire assembly may be selected to apply a treatment to a treatment area. Similarly, either the single, combination, or entire assembly may be actuated to align with a treatment area, as needed. In some configurations, the farming machine may align a treatment mechanism with an identified object in the operating environment. That is, the farming machine may identify an object in the operating environment and actuate the treatment mechanism such that its treatment area aligns with the identified object.

A treatment mechanism 120 may be operable between a standby mode and a treatment mode. In the standby mode the treatment mechanism 120 does not apply a treatment, and in the treatment mode the treatment mechanism 120 is controlled by the control system 130 to apply the treatment. However, the treatment mechanism 120 can be operable in any other suitable number of operation modes.

Control System(s)

The farming machine 100 includes a control system 130. The control system 130 controls operation of the various components and systems on the farming machine 100. For instance, the control system 130 can obtain information about the operating environment, processes that information to identify a farming action to implement, and implements the identified farming action with system components of the farming machine.

The control system 130 can receive information from the detection mechanism 110, the verification mechanism 150, the treatment mechanism, and/or any other component or system of the farming machine 100. For example, the control system may receive measurements from the detection mechanism 110 or verification mechanism 150, or information relating to the state of a treatment mechanism or implemented farming actions from a detection mechanism 110. Other information is also possible.

Similarly, the control system 130 can provide input to the detection mechanism 110, the verification mechanism 150, and/or the treatment mechanism. For instance, the control system 130 may be configured input and control operating parameters of the farming machine 100 (e.g., speed, direction). Similarly, the control system 130 may be configured to input and control operating parameters of the detection mechanism 110 and/or verification mechanism 150. Operating parameters of the detection mechanism 110 and/or verification mechanism 150 may include processing time, location and/or angle of the detection mechanism 110, image capture intervals, image capture settings, etc. Other inputs are also possible.

The control system 130 can be operated by a manager operating the farming machine 100, wholly or fully autonomous, operated by a manager connected to the farming machine 100 by a network, or any combination of the above. For instance, the control system 130 may be operated by an agricultural manager sitting in a cabin of the farming machine 100, or the control system 130 may be operated by an agricultural manager connected to the control system via a wireless network. In another example, the control system may implement an array of control algorithms, machine vision algorithms, decision algorithms, etc. that allow it to operate autonomously or partially autonomously.

The control system 130 may be implemented by a computer or a system of distributed computers. The computers may be connected in various network environments. For example, the control system may be a series of computers implemented on the farming machine 100 and connected by a local area network. In another example, the control system may be a series of computers implemented on the farming machine 100, in the cloud, a client device and connected by a wireless area network.

The control system 130 can apply one or more computer models to determine and implement farming actions in the field. For example, the control system 130 can apply a plant identification module to images acquired by the detection mechanism to determine and implement farming actions. The control system 130 may be coupled to the farming machine 100 such that an agricultural manager (e.g., a driver) can interact with the control system 130. In other embodiments, the control system 130 is physically removed from the farming machine 100 and communicates with system components (e.g., detection mechanism 110, treatment mechanism 120, etc.) wirelessly.

In some configurations, the farming machine 100 may additionally include a communication apparatus, which functions to communicate (e.g., send and/or receive) data between the control system 130 and a set of remote devices. The communication apparatus can be a Wi-Fi communication system, a cellular communication system, a short-range communication system (e.g., Bluetooth, NFC, etc.), or any other suitable communication system.

Other Machine Components

In various configurations, the farming machine may include any number of additional components.

For instance, the farming machine may include a mounting mechanism 140. The mounting mechanism 140 provides a mounting point for the components of the farming machine 100. That is, the mounting mechanism 140 may be a chassis or frame to which components of the farming machine 100 may be attached but could alternatively be any other suitable mounting mechanism 140. More generally, the mounting mechanism 140 statically retains and mechanically supports the positions of the detection mechanism 110, the treatment mechanism 120, and the verification mechanism 150. In an example configuration, the mounting mechanism 140 extends outward from a body of the farming machine 100 such that the mounting mechanism 140 is approximately perpendicular to the direction of travel 115. In some configurations, the mounting mechanism may include an array of treatment mechanisms 120 positioned laterally along the mounting mechanism 140. In some configurations, the farming machine may not include a mounting mechanism 140, the mounting mechanism 140 may be alternatively positioned, or the mounting mechanism 140 may be incorporated into any other component of the farming machine 100.

The farming machine 100 may include locomoting mechanisms. The locomoting mechanisms may include any number of wheels, continuous treads, articulating legs, or some other locomoting mechanism(s). For instance, the farming machine may include a first set and a second set of coaxial wheels, or a first set and a second set of continuous treads. In the either example, the rotational axis of the first and second set of wheels/treads are approximately parallel. Further, each set is arranged along opposing sides of the farming machine. Typically, the locomoting mechanisms are attached to a drive mechanism that causes the locomoting mechanisms to translate the farming machine through the operating environment. For instance, the farming machine may include a drive train for rotating wheels or treads. In different configurations, the farming machine may include any other suitable number or combination of locomoting mechanisms and drive mechanisms.

The farming machine 100 may also include one or more coupling mechanisms 142 (e.g., a hitch). Coupling mechanisms 142 functions to removably or statically couple various components of the farming machine. For example, a coupling mechanism 142 may attach a drive mechanism to a secondary component such that the secondary component is pulled behind the farming machine. In another example, a coupling mechanism 142 may couple one or more treatment mechanisms to the farming machine.

The farming machine 100 may additionally include a power source, which functions to power the system components, including the detection mechanism 110, control system 130, and treatment mechanism 120. The power source can be mounted to the mounting mechanism 140, can be removably coupled to the mounting mechanism 140, or can be incorporated into another system component (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In other configurations, the power source can be incorporated into any other component of the farming machine 100.

IV.B System Environment

Figure 2:
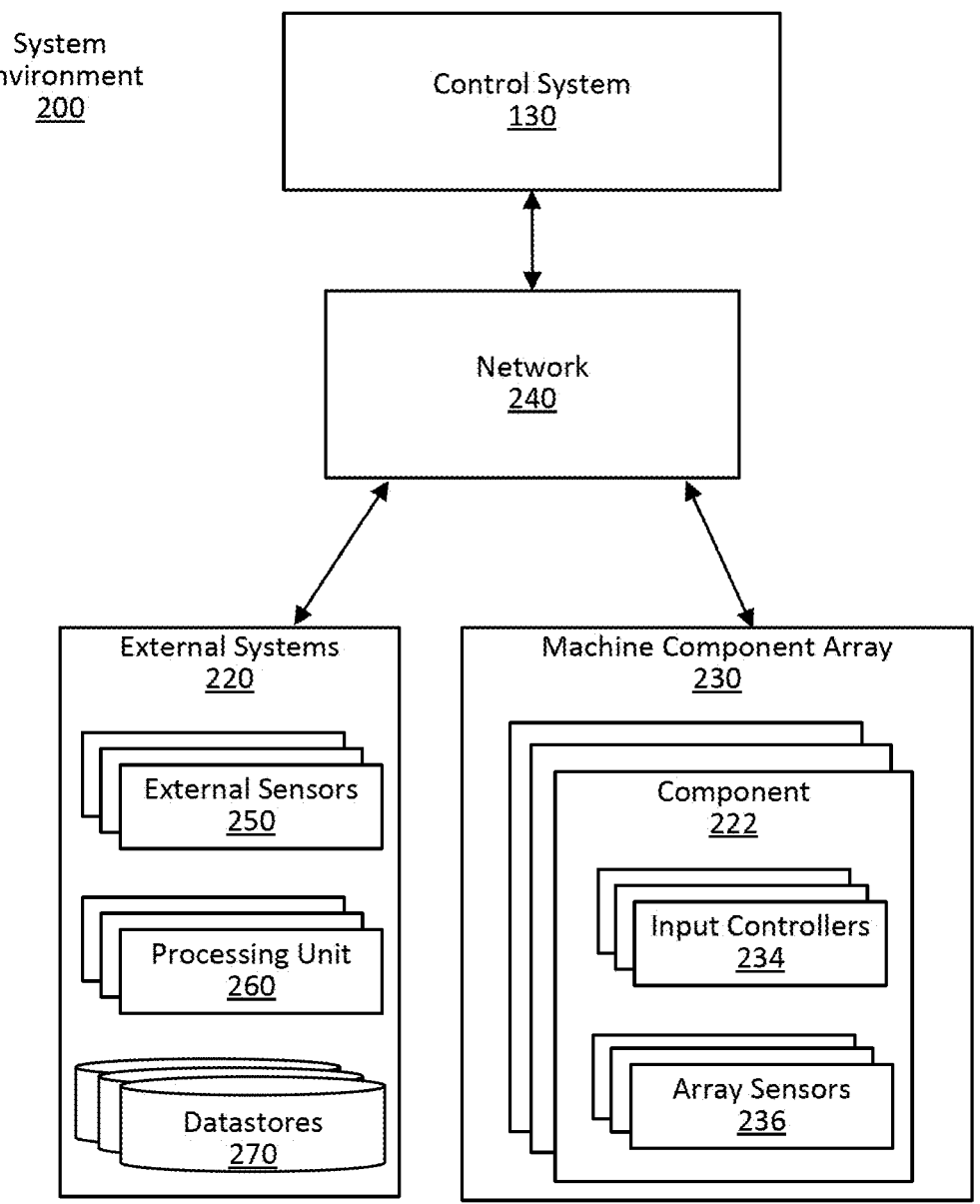
FIG. 2 is a block diagram of the system environment for the farming machine, in accordance with one or more example embodiments.

FIG. 2 is a block diagram of the system environment for the farming machine 100, in accordance with one or more example embodiments. In this example, the control system 130 is connected to external systems 220 and a machine component array 230 via a network 240 within the system environment 200.

The external systems 220 are any system that can generate data representing information useful for determining and implementing farming actions in a field. External systems may include one or more sensors 250, one or more processing units 260, and one or more datastores 270. The one or more sensors 250 can measure the field, the operating environment, the farming machine, etc. and generate data representing those measurements. For instance, the sensors may include a rainfall sensor, a wind sensor, heat sensor, a camera, etc. The processing units may process measured data to provide additional information that may aid in determining and implementing farming actions in the field. For instance, a processing unit may access an image of a field and calculate a weed pressure from the image or may access historical weather information for a field to generate a forecast for the field. Datastores store historical information regarding the farming machine, the operating environment, the field, the area surrounding the farming machine, etc. that may be beneficial in determining and implementing farming actions in the field. For instance, the datastore may store results of previously implemented treatment plans and farming actions for a field, its surrounding field, and the general air. Further, the datastore may store results of specific faming actions in the field, or results of farming actions taken in nearby fields having similar characteristics. The datastore may also store historical weather, flooding, field use, planted crops, etc. for the field and the surrounding area. Finally, the datastores may store any information measured by other components in the system environment.

The machine component array 230 includes one or more components 222. Components 222 are elements of the farming machine 100 that can take farming actions (e.g., a treatment mechanism 120). As illustrated, each component 222 has one or more input controllers 234 and one or more sensors 236, but a component may include only sensors 236 or only input controllers 234. An input controller 234 controls the function of the component. For example, an input controller 234 may receive machine commands via the network 240 and actuate the component in response. A sensor 236 generates data representing measurements of the operating environment and provides that data to other components those within the system environment 200. The measurements may be of the component, the farming machine 100, or the operating environment. For example, a sensor 236 may measure a configuration or state of the component 222 (e.g., a setting, parameter, power load, etc.), measure conditions in the operating environment (e.g., moisture, temperature, etc.), capture information representing of the operating environment (e.g., images, depth information, distance information), and generate data representing the measurement(s).

The network 240 connects nodes of the system environment 200 to allow microcontrollers and devices to communicate with each other. In some embodiments, the components are connected within the network as a Controller Area Network (CAN). In this case, within the network each element has an input and output connection, and the network 240 can translate information between the various elements. For example, the network 240 receives input information from the external systems 220 and the component array 230, processes the information, and transmits the information to the control system 130. The control system 130 generates a farming action based on the information and transmits instructions to implement the farming action, for example, to the appropriate component(s) 222 of the component array 230.

Additionally, the system environment 200 may be other types of network environments and include other networks, or a combination of network environments with several networks. For example, the system environment 200, can be a network such as the Internet, a LAN, a MAN, a WAN, a mobile wired or wireless network, a private network, a virtual private network, a direct communication line, and the like.

V. Crop Yield Component Map

FIGS. 3-6 relate to methods and systems for applying nitrogen to a field, generating and analyzing crop yield data, and generating a crop yield component map.

Figure 3A:
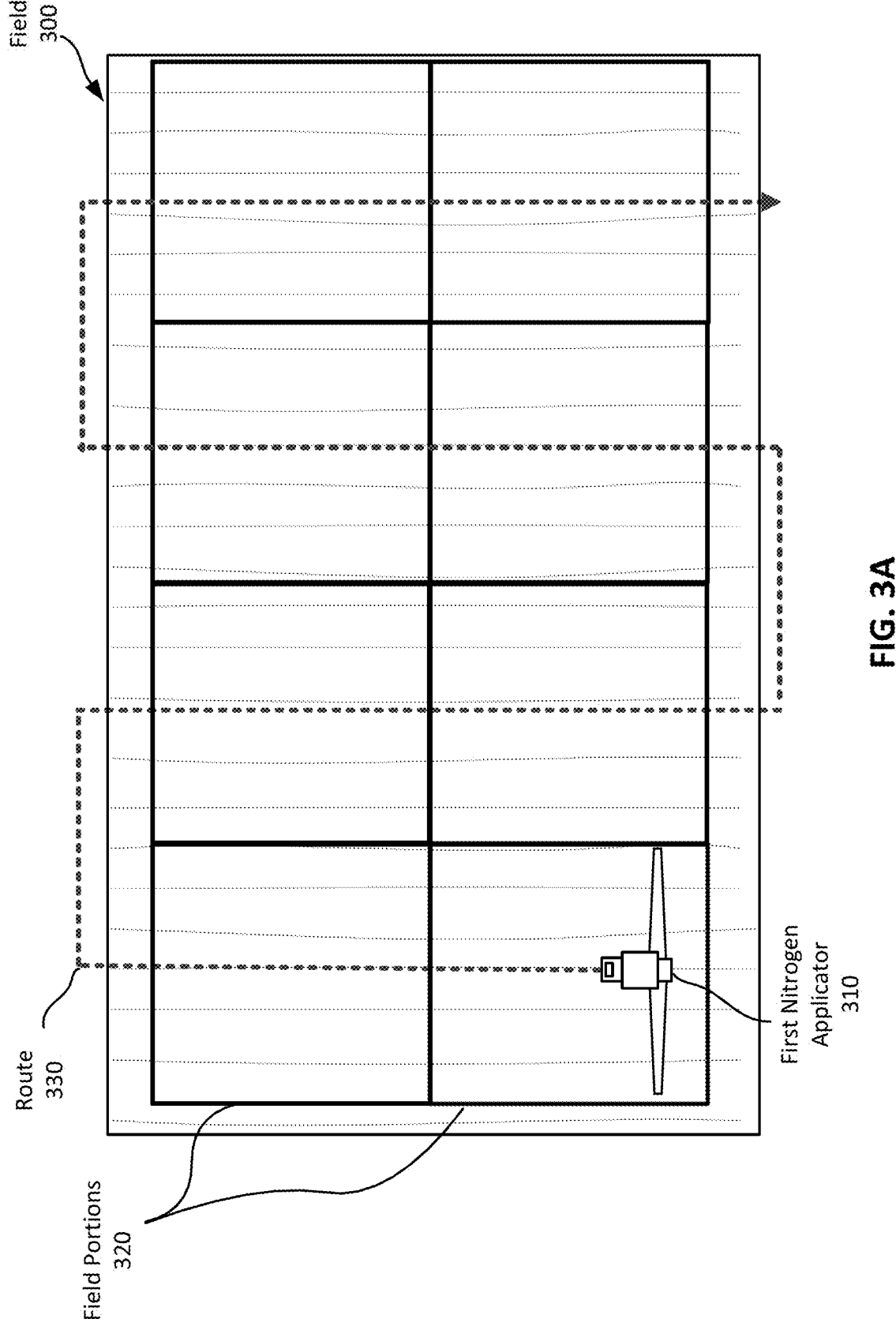
FIGS. 3A-3C are top views of farming machines moving through a field at different time periods in an agricultural cycle, in accordance with one or more example embodiments.
Figure 3B:
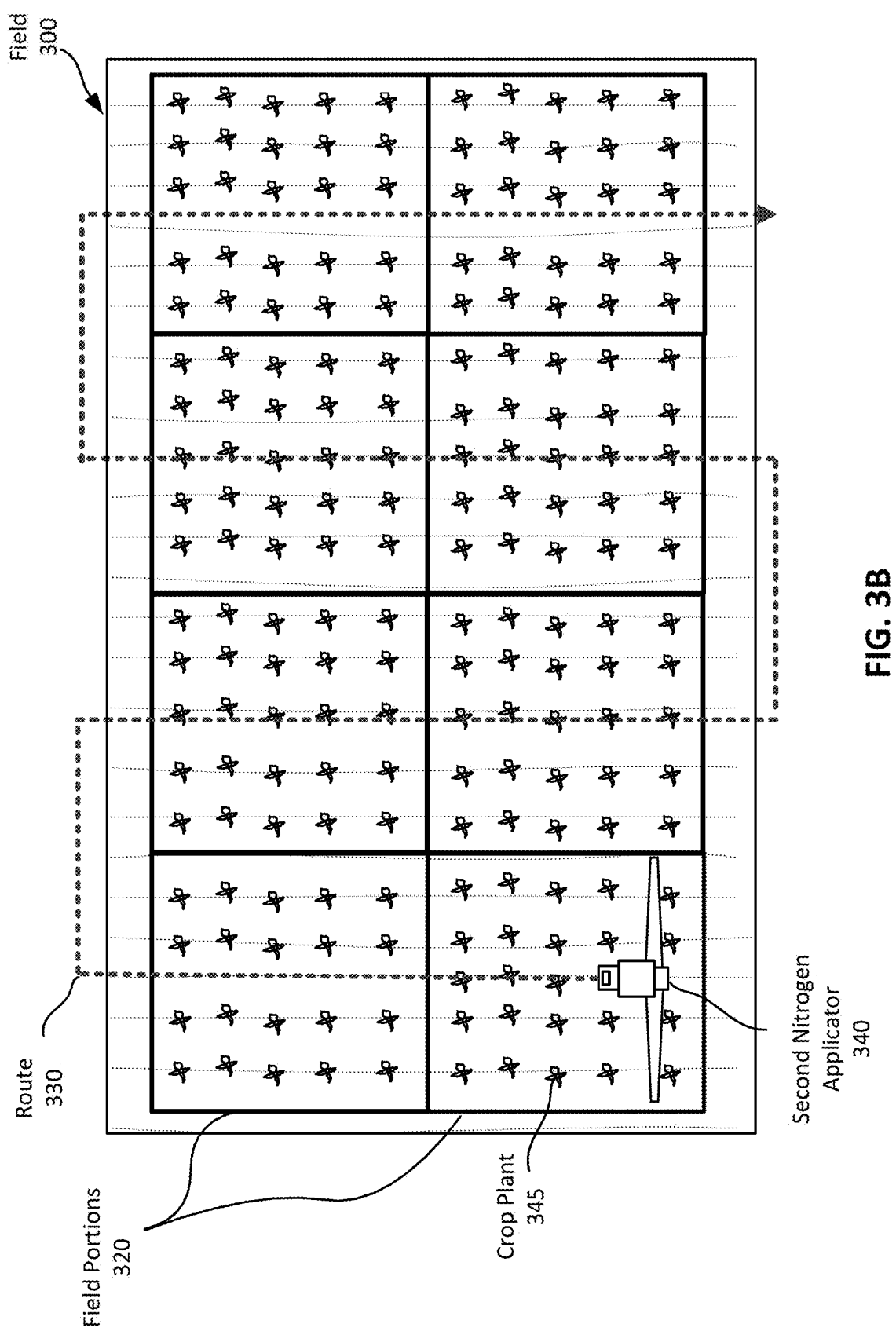

Referring to FIGS. 3A and 3B, nitrogen may be applied to a field during an agricultural cycle because it may have a strong effect on plant part metrics, such as the size, weight, and number of the plant parts grown by the crop. Nitrogen may be applied during distinct time periods. For example, nitrogen is applied during a first-sub time period and a second sub-time period that occurs after the first sub-time period.

FIG. 3A illustrates a top view of a first nitrogen applicator farming machine 310 moving on a route 330 through a field 300 during the first sub-time period, according to an embodiment. The first sub-time period occurs during an early phase of the agricultural cycle. For example, the first sub-time period occurs before seeds are planted in the field or prior to a crop sprouting. In in another example, the first sub-time period occurs during a vegetative stage of the crop.

The first nitrogen applicator 310 applies nitrogen to the field portions 320 as it passes through the field 300. The first nitrogen applicator 310 may be a specialized farming machine configured to apply nitrogen or it may be a general farming machine coupled to a treatment mechanism 120 specifically configured to apply the nitrogen. The first nitrogen applicator 310 may apply different amounts of nitrogen to each field portion 320. The amount applied to each field portion 320 may be based on several factors. For example, the first nitrogen applicator 310 applies nitrogen to compensate for nitrogen extracted from plants that previously grew in the field 300 (referred to as nitrogen balancing). Additionally or alternatively, the amount applied to a field portion 320 is based on the crop yield (or another metric) harvested from the portion during one or more past harvests. For example, if the total number of plant parts harvested from a field portion 320 during a past harvest was less than a threshold value, more nitrogen may be applied during the first sub-time period.

FIG. 3B illustrates a top view of a second nitrogen applicator farming machine 340 moving on a route 330 through the field 300 during a second sub-time period, according to an embodiment. FIG. 3B includes plants 345 growing above the surface because the second sub-time period occurs after the first sub-time period and during a middle or late phase of the agricultural cycle. For example, the second sub-time period occurs after the crops have sprouted. In another example, the second sub-time period occurs between the late vegetative stage and the reproductive stage.

The second nitrogen applicator 340 applies additional nitrogen to the field portions 320 as it passes through the field 300. The second nitrogen applicator 340 may apply different amounts of nitrogen to each field portion 320. For example, the amount applied to a field portion 320 during the second sub-time period is based on the size or weight (or another metric) of plant parts harvested from the portion 320 during one or more past harvests.

The second nitrogen applicator 340 may be a different farming machine than the first nitrogen applicator 310. Since the field portions 320 include plants 345 growing above the surface, the second nitrogen applicator 340 may be configured to apply nitrogen without damaging the plants 345 (e.g., it is a Y-Drop farming machine). The second nitrogen applicator 340 may be a specialized farming machine or it may be a general farming machine coupled to a treatment mechanism 120 specifically configured to apply the nitrogen.

For simplicity, the above description describes the application of nitrogen during two distinct time periods (the first and second sub-time periods). However, nitrogen may be applied any number of times during any number of time periods. The number of applications depends on, for example, the amount of nitrogen available and the crop's sensitivity to nitrogen during its various growth stages.

Figure 3C:
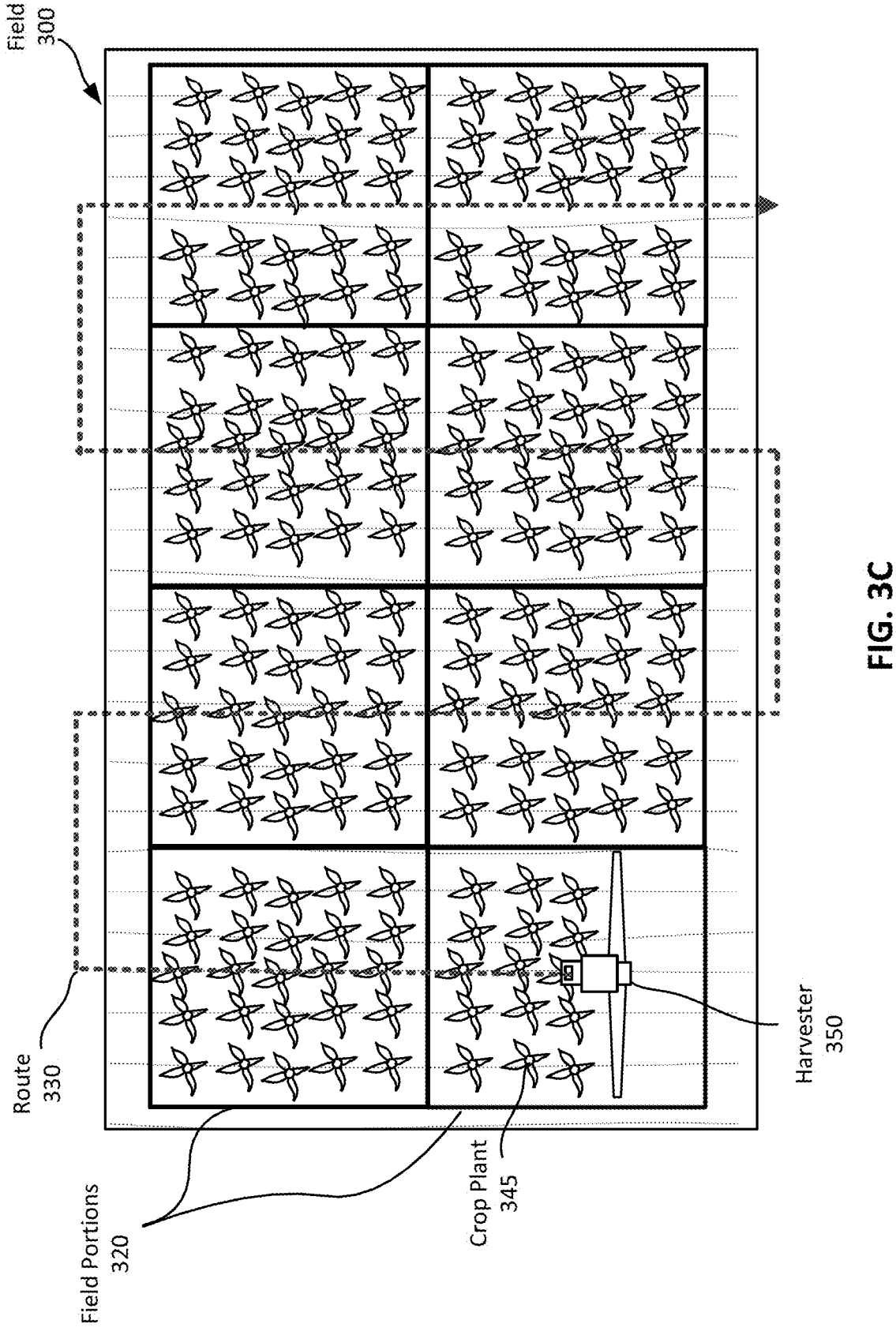

During a second time period, a harvester farming machine may pass through the field 300. FIG. 3C illustrates a top view of a harvester farming machine 350 moving on a route 330 through the field 300 during a second time period, according to an embodiment. FIG. 3C includes large plants 345 growing in the field 300 because the second time period occurs during a harvest period of the agricultural cycle (e.g., when plant parts of the crop are ripe).

The harvester 350 harvests plant parts from the plants 345 growing in the field portions 320. Harvesting includes extracting and gathering plant parts from the crop plants 345. Generally, the harvester harvests the same plant part from each plant 345. The harvested plant part may be any part of the plant. For example, the crop is corn or soy plants and the harvester 350 harvests kernels from the plants. In another example, the crop is cotton plants and the plant part is cotton harvested from the plants. The harvester 350 may be a specialized farming machine configured to harvest plant parts or it may be a general farming machine coupled to a treatment mechanism 120 specifically configured to harvest plant parts.

The harvester 350 includes a sensor (e.g., sensor 250 or 236) that detects a physical property of the harvested plant parts. Using the sensor, the harvester 350 generates crop yield data associated with the plant parts. The sensor may generate the crop yield data in real time as the harvester 350 moves through the field. An example sensor is a weight sensor (e.g., mass flow sensor) that measures weights of the plant parts as they are harvested. A mass flow sensor may operate by detecting the force of the plant parts as they hit a plate while moving through the machine. In another example, the harvester 350 includes an image sensor, such as a grain quality bypass camera. The image sensor (e.g., grain quality camera) captures images of the plant parts as they move through the machine. Image sensors may capture images before and after the plant parts are harvested. For example, image sensors capture images of corn before and after it passes through a harvesting rotor. The images may be analyzed (e.g., by the bypass camera, a control system, or a server system) to determine metrics of the plant parts, such as the size, number (e.g., kernel number or number of kernel rows on a corn cob), color, shape, or quality of the plant parts. If the plant part is cotton, a sensor may generate plant metrics that describe the fiber length, strength, or quality. Another example of a plant part metric is nutrient content. For example, nutrient content describes the protein or oils in a plant part (e.g., corn kernel). This may be determined by passing a plant part through an NMR (nuclear magnetic resonance) instrument.

Figure 4:
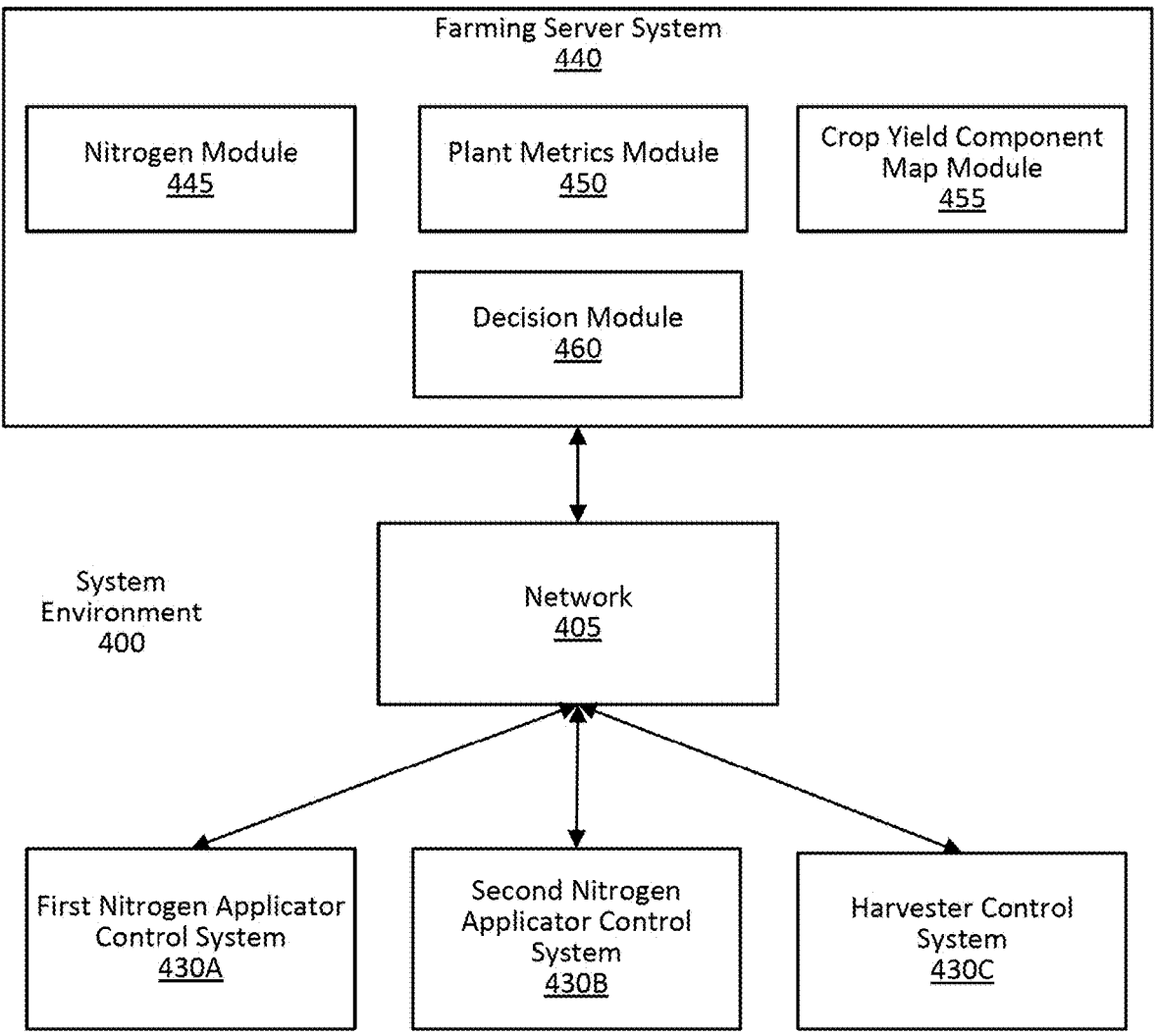
FIG. 4 is a block diagram of a system environment for a farming server system, in accordance with one or more example embodiments.

FIG. 4 is a block diagram of a system environment 400 for a farming server system 440, in accordance with one or more example embodiments. The system environment 400 of FIG. 4 includes a server system 440, a network 405, and three control systems 430. The server system 440 includes a nitrogen module 445, a plant metrics module 450, a crop yield component map module 455, and a decision module 460. The system environment 400 can include additional or fewer components than described herein and the modules may be implemented as hardware and/or software. Among other advantages, the server system 440 aggregates data from multiple farming machines (via the control systems 430) to generate a crop yield component map. Conventional systems lack a system which can communicate with multiple farming machines to retrieve and aggregate farming data. Thus, embodiments enable data to be aggregated in new ways so that new farming insights can be determined (e.g., how much nitrogen to apply).

The network 405 connects components of the server system environment 400. The network 405 is similar to the network 240 described with respect to FIG. 2. The systems 430 represent control systems 130 for the first nitrogen applicator 310 (reference number 430A), the second nitrogen applicator 340 (reference number 430B), and the harvester 350 (reference number 430C). These control systems 430 communicate data to the server system 440 via the network 405. For example, control systems 430A and 430B transmit amounts of nitrogen applied to the field 300 by nitrogen applicators 310 and 340 and control system 430C transmits the crop yield data generated by the harvester 350. The server system 440 uses data from the control systems 430 to generate a crop yield component map and determine future nitrogen applications (e.g., applied during a third time period subsequent to the first and second time periods).

The nitrogen module 445 determines amounts of nitrogen applied to each field portion 320 during the first time period. An amount of nitrogen for each field portion 320 may be determined based on data from control systems 430A and 430B. For example, the nitrogen module 445 analyzes farming actions performed by the first and second nitrogen applicators in the field 300. The nitrogen module 445 may also analyze GNSS coordinates (e.g., GPS coordinates) associated with the farming actions to associate nitrogen amounts to each field portion 320. If several nitrogen farming actions are performed in a field portion 320, the total amount of applied nitrogen may be summed together to determine the amount of nitrogen applied to the field portion 320. In some embodiments, the nitrogen module 445 determines amounts of nitrogen applied to each field portion during sub-time periods. For example, the nitrogen module 445 analyzes nitrogen farming actions performed by the first nitrogen applicator 310 to determine amounts of nitrogen applied during the first sub-time period, and the nitrogen module 445 analyzes nitrogen farming actions performed by the second nitrogen applicator 340 to determine amounts of nitrogen applied during the second sub-time period.

The plant metrics module 450 accesses the crop yield data (e.g., transmitted by the harvester control system 430C) and analyzes the crop yield data to determine plant part metrics of the harvested plant parts. The metrics may be determined for one or more field portions 320 using GNSS coordinates associated with the harvester farming actions. As previously stated, example plant part metrics include the weight, size (e.g., kernel size), color, shape, or number of the plant parts.

The plant metrics module 450 may determine weights of plant parts by analyzing data generated by the weight sensor (e.g., mass flow sensor). A weight value for a field portion may be the average weight of the individual plant parts or it may be the total weight of the plant parts harvested in the field portion.

The plant metrics module 450 may determine (e.g., the average or distribution of) sizes, colors, or shapes of plant parts by analyzing data generated by the grain quality bypass camera. For example, the plant metrics module 450 analyzes images of plant parts captured by the camera (e.g., using image recognition software). In some embodiments, the images are analyzed by the harvester control system 430C and the plant metrics module 450 analyzes the resulting data.

The plant metric module 450 may determine nutrient content of plant parts, for example, by passing plant parts through an NMR (nuclear magnetic resonance) instrument. In another example, the color of plant parts may indicate the nutrient content of the plant parts.

The plant metrics module 450 may determine the total number of plant parts harvested in a field portion. For example, images from the grain quality bypass camera are analyzed to estimate the total number plant parts harvested. In another example, if the density of a plant part is known, the plant metrics module 450 may estimate the total number of harvested plant parts based on the weights and sizes of the plant parts. These calculations may be further supplemented with planting data (e.g., the number of plants planted in the field portion).

The crop yield component map module 455 provides instructions (e.g., code) for generating and rendering a crop yield component map for presentation in a visual interface on a display. The crop yield component map is a digital map that maps, for one or more field portions, a plant part metric associated with a field portion and an amount of nitrogen applied to the field portion. The crop yield component map may be updated according to input and instructions (e.g., from an agricultural manager). For example, responsive to receiving input (e.g., interacting with panel 570 in FIG. 5B), a query is sent to the map module 455 for information associated with the input and the map is updated based on the information. In another example, the map module 455 performs additional calculations based on input and the interface is updated to display the results of the calculations. To generate the map, the crop yield component module 455 receives the nitrogen amounts from the nitrogen module 445 and the plant part metrics from the metrics module 450. Example crop yield component maps are illustrated in FIGS. 5A and 5B.

Figure 5A:
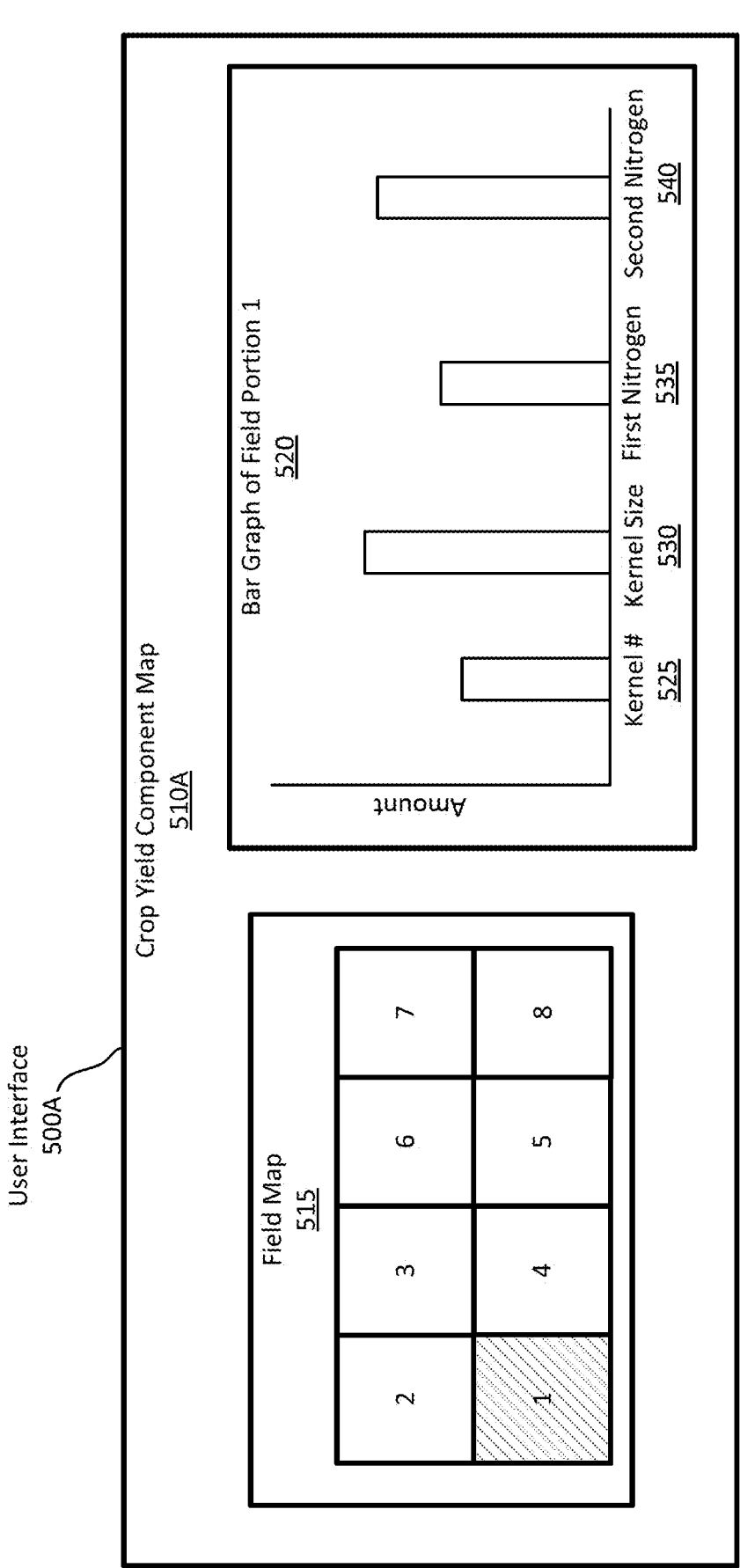
FIGS. 5A-5B illustrate crop yield component maps, in accordance with one or more example embodiments.

FIG. 5A illustrates an example user interface (UI) 500A that includes a crop yield component map 510A. The UI 500A may be displayed on a display. The component map 510A includes a map 515 of the field 300 and a bar graph 520. The map 515 includes sections that represent the field portions (labeled 1-8). The bar graph 520 plots data associated with one or more sections in the map 515. In the example of FIG. 5A, the plant parts are kernels (e.g., corn kernels), and the bar graph 520 plots the kernel number 525, the kernel size 530, the amount of nitrogen applied during the first sub-time period 535 and the amount of nitrogen applied during the second sub-time period 540. By selecting a section in the map 515 (e.g., section 2), the bar graph 520 may be updated to illustrate data associated with the corresponding field portion 320. This allows a manager to compare mapped data for each field portion 320.

Figure 5B:
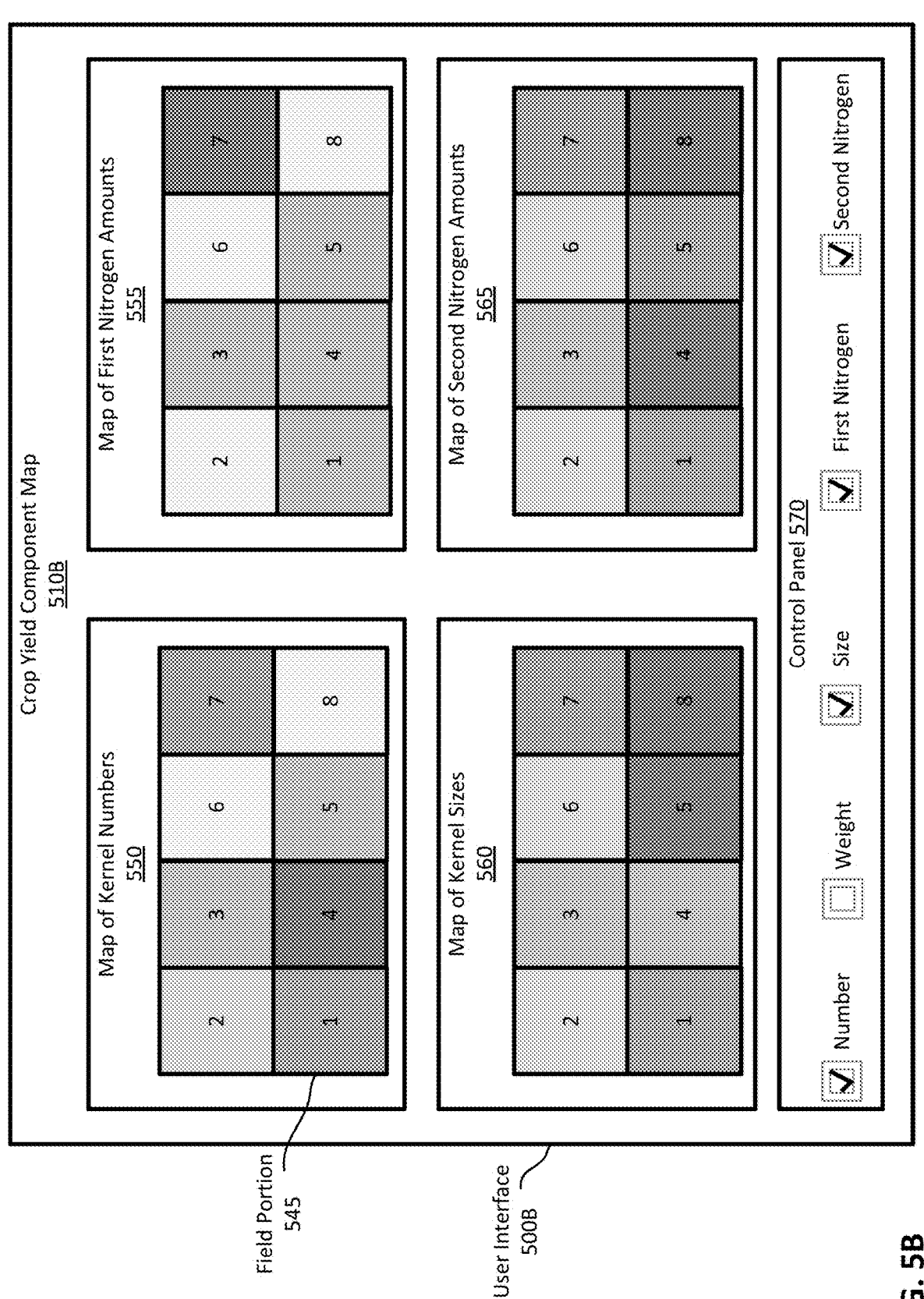

FIG. 5B illustrates a UI 500B with another crop yield component map 510B. The component map 510B includes four heat maps of the of the field 300 and a control panel 570. Similar to FIG. 5A, each heat map includes sections that correspond to field portions 320 (labeled 1-8).

In the example of FIG. 5B, the plant parts are kernels. Heat map 550 illustrates the number of harvested kernels in each field portion 320, where the shading of each map section represents the number. Heat map 560 illustrates the average size of the harvested kernels in each field portion 320, where the shading of each map section represents the size. Heat map 555 illustrates the amount of nitrogen applied during the first sub-time period in each field portion 320. The shading of each map section represents the amount. Heat map 565 illustrates the amount of nitrogen applied during the second sub-time period in each field portion 320. The shading of each map section represents the amount. Additionally or alternatively, each section may include overlaid text to indicate the quantities represented by the shading.

The control panel 570 allows an agricultural manager to interact with the UI 500B. In the example of FIG. 510B, the control panel 570 allows the manager to select which heat maps to view. The available options are maps of the kernel number, kernel weight, kernel size, nitrogen applied during the first sub-time period, and nitrogen applied during the second sub-time period. For example, responsive to a manager selecting the box next to "weight," the UI 500B updates to include a heat map representing weights of the harvested kernels. In some embodiments, the crop yield component map 510A includes an additional heat map that illustrates the total amount of nitrogen applied to each field portion during the first time period (which includes the first and second sub-time periods). This may allow one to determine what ratio of nitrogen was applied during each sub-time period. In some embodiments, the crop yield component map 510A includes an additional heat map that illustrates the total yield of the plant parts (e.g., in weight/acre or bushels/acre).

The crop yield component map 510 allows a manager to compare, for each field portion, plant part metrics with the amounts of nitrogen applied (e.g., during the first and second sub-time periods). This allows the manager to better understand the agricultural cycle for the harvested crop. It also allows the manager to make informed farming decisions for subsequent agricultural cycles. The manager may use the crop yield component map 510 to decide when to apply nitrogen, where to apply it, and how much to apply for a subsequent agricultural cycle. For example, based on the crop yield component map, the manager may decide to apply less nitrogen to a field portion during the first sub-time period but apply more nitrogen to the field portion during the second sub-time period (e.g., if the crop is corn and the kernel number for the field portion is above a target value but the kernel size or weight is below a target size or weight value). These decisions may also be determined (or suggested) by the decision module 460.

Referring back to FIG. 4, the decision module 460 determines amounts of nitrogen to apply to field portions during a future time period (also referred to as a third time period). The decision module 460 may make these determinations based on the generated crop yield component map 510 or the underlying data. These determinations may also be based on a total amount of available nitrogen or the crop in the field 300 (since different crops may respond differently to nitrogen amounts applied during phases of the agricultural cycle).

Generally, a crop may receive a first threshold amount of nitrogen during each future sub-time period to stimulate plant part growth. Providing additional nitrogen above the first threshold may stimulate additional growth. However, diminishing returns may occur after a second threshold amount is applied. Furthermore, after a third threshold (larger than the second threshold) amount is applied, the crop may not absorb any more nitrogen. The first, second, and third threshold amounts may be different for each sub-time period. Various factors may affect a crops ability to absorb nitrogen. Thus, these factors may also affect the first, second, and third threshold amounts. Example factors include crop genetics (e.g., a genetic strain of a crop has a different nitrogen uptake rate (e.g., for each sub-time period) than another genetic strain of the crop) and weather and other environmental factors (e.g., amount of sunshine, amount of rain, and nutrient availability outside of nitrogen). One or more of these thresholds may be known or determined (e.g., by the decision module 460 analyzing nitrogen amounts and plant part metrics from previous agricultural cycles).

The decision module 460 may determine amounts of nitrogen to be applied during a future first sub-time period (e.g., by the first nitrogen applicator 310). As previously described, a plant part metric (e.g., the plant part number) may be influenced by the amount of nitrogen applied during the first sub-time period. Thus, the decision module 460 may determine amounts of nitrogen to apply during a future first sub-time period based on the amount of nitrogen applied during the first sub-time period and the plant part metric.

For example, if the plant part number of a field portion is below a target value, the decision module 460 determines that the portion should receive an increased amount of nitrogen during a future first sub-time period (compared to the nitrogen previously applied during the first sub-time period). In another example, if a field portion did not receive the first threshold amount of nitrogen (described above), the decision module 460 may determine that the portion should receive an increased amount of nitrogen during a future first sub-time period. In another example, if a field portion received more than the third threshold amount of nitrogen (described above), the decision module 460 may determine that the portion should receive a decreased amount of nitrogen to reduce wasted nitrogen. In another example, if a field portion received between the second and third threshold amount, the decision module 460 may determine that the portion should receive a decreased amount of nitrogen so that the saved nitrogen can be applied to another field portion (e.g., a field portion that received less than the first threshold amount). This may increase the efficiency of the total amount of nitrogen available for use.

The decision module 460 may determine amounts of nitrogen to be applied during a future second sub-time period (e.g., by the second nitrogen applicator 340). As previously described, a plant part metric determined by the plant part metrics module 450 (e.g., the size or weight) may be influenced by the amount of nitrogen applied during the second sub-time period. Thus, the decision module 460 may determine amounts of nitrogen to apply during a future second sub-time period based on the amount of nitrogen applied during the second sub-time period and the and the plant part metric. For example, if the plant part size or weight of a field portion is below a target value, the decision module 460 may determine that the portion should receive an increased amount of nitrogen during a future second sub-time period (compared to the nitrogen previously applied during the second sub-time period). Additional examples may be similar to the examples described above with respect to determining nitrogen amounts to apply during the future first sub-time period.

The decision module 460 may also quantify the relationship between nitrogen and a plant part metric (e.g., if the relationship is unknown or not known exactly). For example, the decision module 460 may determine how kernel size is influenced by various amounts of nitrogen applied during the first and second sub-time periods (e.g., its determines the first, second, and third thresholds). In another example, the decision module 460 may determine how kernel number is influenced by various amounts of nitrogen applied during the first and second sub-time periods. The decision module 460 may also determine whether nitrogen should be applied a different number of times during the agricultural cycle.

The above description describes the modules as being stored and executed by the server system 440. However, a module may be stored and executed by another system, such as a farming machine control system. Additionally, the functionality of each module may be performed by a single system or performed in parts by different systems. For example, part of the functionality of a module is performed by a farming machine control system and another part is performed by the server system 440.

Figure 6:
FIG. 6 illustrates a method for forming a crop yield component map, in accordance with one or more example embodiments.
Figure 6:
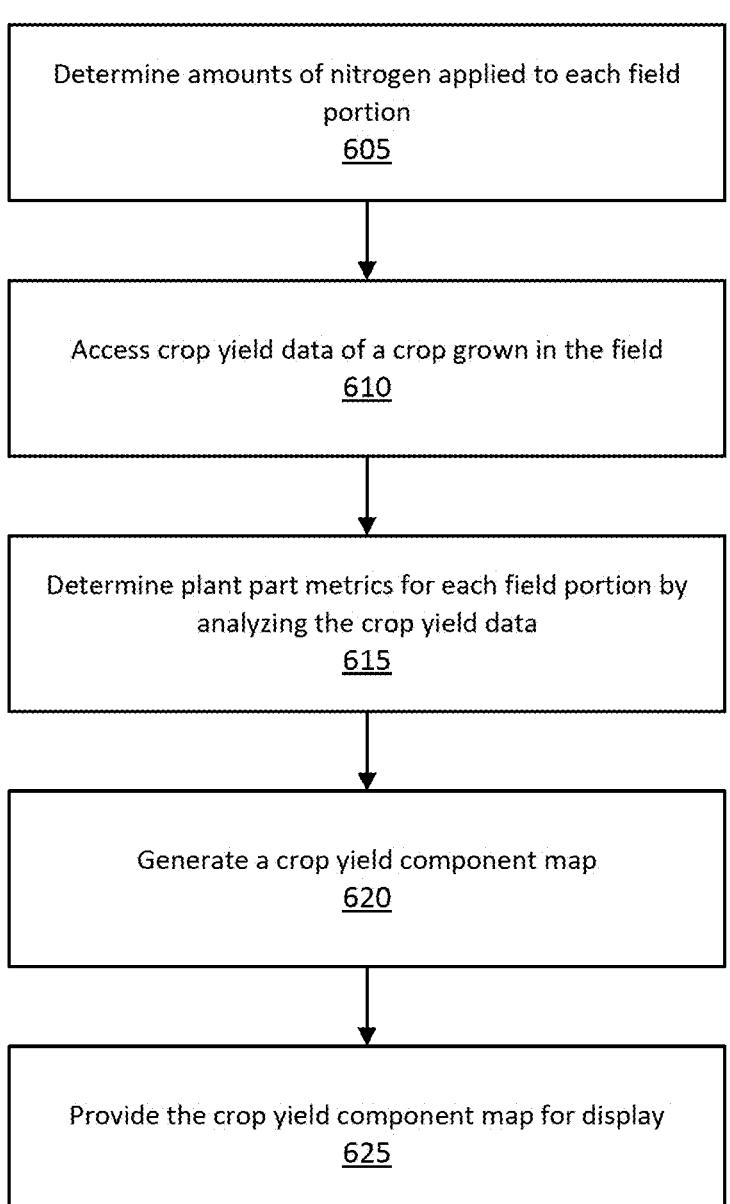

FIG. 6 illustrates a method 600 for forming a crop yield component map, in accordance with an example embodiment. The method 600 may be performed from the perspective of the server system 440. The method 600 can include additional or fewer steps than described herein. Additionally, the steps can be performed in different order, or by different components than described herein.

For a field that includes a plurality of field portions, the server system 440 determines 605 amounts of nitrogen applied to each field portion by a first set of one or more farming machines (e.g., the first and second nitrogen applicators) that travelled through the field during a first time period. The server system 440 accesses 610 crop yield data of a crop grown in the field. The crop yield data is generated by sensors on a second set of one or more farming machines (e.g., the harvester 350) that travelled through the field during a second time period that occurred subsequent to the first time period. A portion of the crop yield data may be generated by a weight sensor (e.g., a mass flow sensor) or capturing one or more images from a grain quality bypass camera. The server system 440 determines 615, by analyzing the crop yield data, plant part metrics corresponding to the harvested plant parts for each field portion. Example metrics include the plant part sizes, plant part weights, and total number of harvested plant parts. The server system 440 generates 620 a crop yield component map that maps, for each field portion, a plant part number associated with the field portion, a plant part metric associated with the field portion, and an amount of nitrogen applied to the field portion. The server system 440 provides 625 the crop yield component map for display.

VI. Control System

Figure 7:
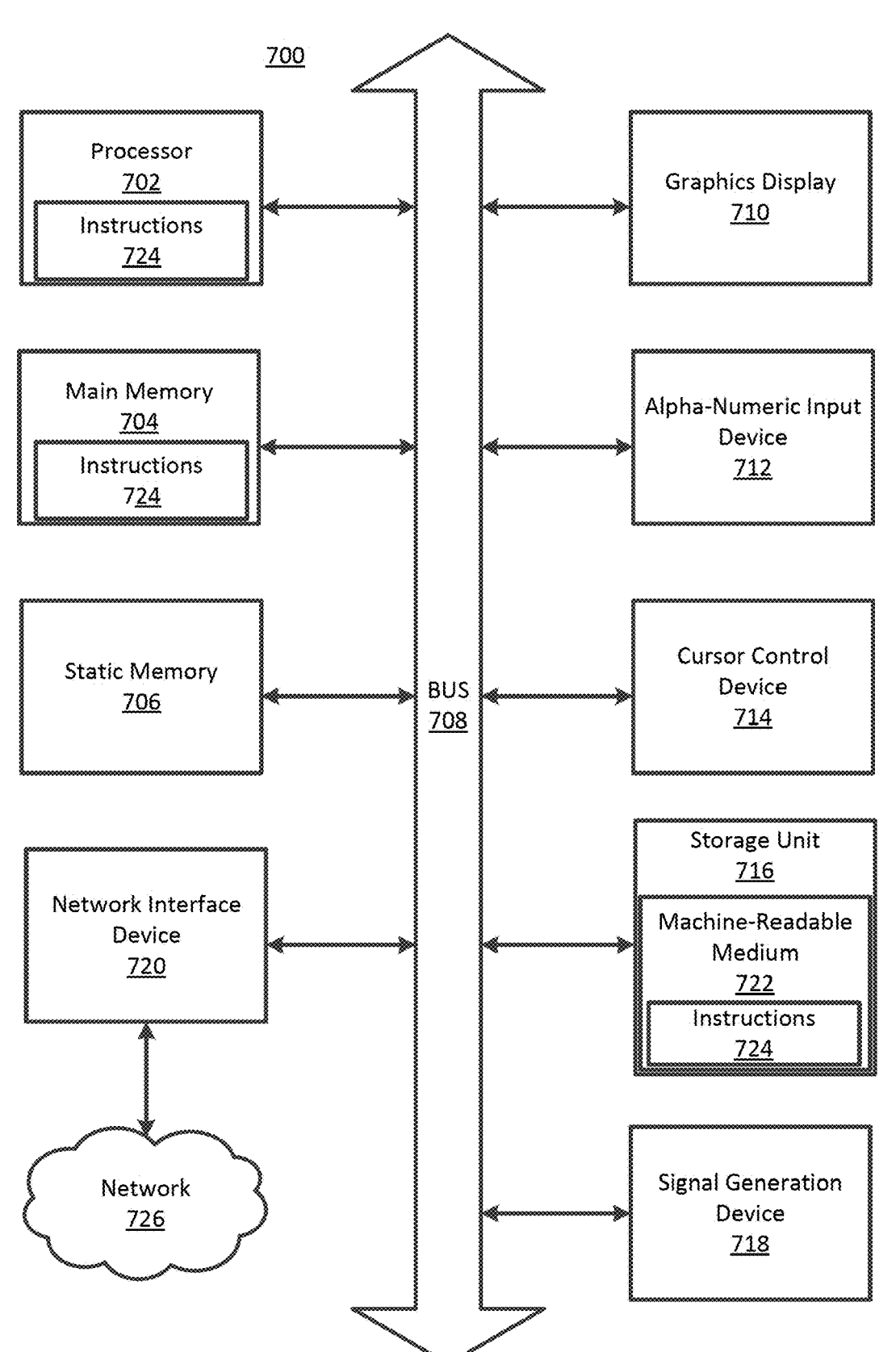
FIG. 7 is a block diagram illustrating components of an example machine for reading and executing instructions from a machine-readable medium, in accordance with one or more example embodiments.

FIG. 7 is a block diagram illustrating components of an example machine for reading and executing instructions from a machine-readable medium, in accordance with one or more example embodiments. Specifically, FIG. 7 shows an example diagrammatic representation of the server system 440 in the example form of a computer system 700. FIG. 7 may be applicable to the control system 130. The computer system 700 can be used to execute instructions 724 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a client-server network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processing units (generally processor 702). The processor 702 is, for example, a central processing unit (CPU), a graphics processing unit (GPU), a digital signal processor (DSP), a control system, a state machine, one or more application specific integrated circuits (ASICs), one or more radio-frequency integrated circuits (RFICs), or any combination of these. The computer system 700 also includes a main memory 704. The computer system may include a storage unit 77. The processor 702, memory 704, and the storage unit 716 communicate via a bus 708.

In addition, the computer system 700 can include a static memory 706, a graphics display 710 (e.g., to drive a plasma display panel (PDP), a liquid crystal display (LCD), or a projector). The computer system 700 may also include an alphanumeric input device 712 (e.g., a keyboard), a cursor control device 88 (e.g., a mouse, a trackball, a joystick, a motion sensor, or other pointing instrument), a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. For example, the instructions 724 may include the functionalities of modules of the system 130 described in FIG. 4. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726 via the network interface device 720.

VII. Additional Considerations

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions are presented in terms of algorithms or models and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some of the operations described herein are performed by a computer (e.g., physically mounted within a machine 100). This computer may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMS, EEPROMs, magnetic or optical cards, or any type of non-transitory computer readable storage medium suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a system and a process for generating and using a crop yield component map to determine amounts of nitrogen to apply to the field. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

What is claimed is:

1. A method comprising:

receiving data of a crop yield component map that maps, for a field portion in a field, plant part metrics corresponding to harvested plant parts in the field portion and amounts of nitrogen previously applied to the field portion during a first agricultural cycle including sprouting and harvesting of a crop in the field;

determining, based on the data of the crop yield component map, a first amount of nitrogen to apply to the field portion during a first sub-time period of a second agricultural cycle, wherein the second agricultural cycle occurs after the first agricultural cycle;

determining, based on the data of the crop yield component map, a second amount of nitrogen to apply to the field portion during a second sub-time period of the second agricultural cycle, wherein the second sub-time period occurs after the first sub-time period; and at least one of:

wherein the first sub-time period of the second agricultural cycle occurs before seeds of the crop sprout; or wherein the second sub-time period of the second agricultural cycle occurs after seeds of the crop sprout.

2. The method of claim 1, further comprising instructing a farming machine to apply the first amount of nitrogen to the field portion during the first sub-time period of the second agricultural cycle.

3. The method of claim 2, further comprising instructing the farming machine or another farming machine to apply the second amount of nitrogen to the field portion during the second sub-time period of the second agricultural cycle.

4. The method of claim 1, further comprising: instructing an agricultural manager of the field (a) to apply the first amount of nitrogen to the field portion during the first sub-time period of the second agricultural cycle and (b) to apply the second amount of nitrogen to the field portion during the second sub-time period of the second agricultural cycle.

5. A method comprising:

receiving data of a crop yield component map that maps, for a field portion in a field, plant part metrics corresponding to harvested plant parts in the field portion and amounts of nitrogen previously applied to the field portion during a first agricultural cycle including sprouting and harvesting of a crop in the field;

determining, based on the data of the crop yield component map, a first amount of nitrogen to apply to the field portion during a first sub-time period of a second agricultural cycle, wherein the second agricultural cycle occurs after the first agricultural cycle; and determining, based on the data of the crop yield component map, a second amount of nitrogen to apply to the field portion during a second sub-time period of the second agricultural cycle, wherein the second sub-time period occurs after the first sub-time period, wherein the amounts of nitrogen previously applied to the field portion during the first agricultural cycle of the crop yield component map includes:

a third amount of nitrogen previously applied to the field portion by a first farming machine during a first sub-time period of the first agricultural cycle, wherein the first sub-time period of the first agricultural cycle occurred before sprouting of the crop in the field; and a fourth amount of nitrogen previously applied to the field portion by a second farming machine during a second sub-time period of the first agricultural cycle that occurred subsequent to the first sub-time period, wherein the second sub-time period of the first agricultural cycle occurred after sprouting and before harvesting of the crop in the field.

6. The method of claim 5, wherein the first amount of nitrogen is determined based on (a) a first metric of the plant part metrics and (b) the third amount of nitrogen.

7. The method of claim 6, wherein the second amount of nitrogen is determined based on (a) a second metric of the plant part metrics and (b) the fourth amount of nitrogen.

8. The method of claim 7, wherein:

the crop is corn;

the first metric is the average number of kernels on a cob; and the second metric is the average weight or size of each kernel.

9. A non-transitory computer-readable storage medium storing instructions that, when executed by a computer system, causes the computer system to perform operations comprising:

receiving data of a crop yield component map that maps, for a field portion in a field, plant part metrics corresponding to harvested plant parts in the field portion and amounts of nitrogen previously applied to the field portion during a first agricultural cycle including sprouting and harvesting of a crop in the field;

determining, based on the data of the crop yield component map, a first amount of nitrogen to apply to the field portion during a first sub-time period of a second agricultural cycle, wherein the second agricultural cycle occurs after the first agricultural cycle;

determining, based on the data of the crop yield component map, a second amount of nitrogen to apply to the field portion during a second sub-time period of the second agricultural cycle, wherein the second sub-time period occurs after the first sub-time period; and at least one of:

wherein the first sub-time period of the second agricultural cycle occurs before seeds of the crop sprout; or wherein the second sub-time period of the second agricultural cycle occurs after seeds of the crop sprout.

10. The non-transitory computer-readable storage medium of claim 9, further comprising instructing a farming machine to apply the first amount of nitrogen to the field portion during the first sub-time period of the second agricultural cycle.

11. The non-transitory computer-readable storage medium of claim 10, further comprising instructing the farming machine or another farming machine to apply the second amount of nitrogen to the field portion during the second sub-time period of the second agricultural cycle.

12. The non-transitory computer-readable storage medium of claim 9, further comprising: instructing an agricultural manager of the field (a) to apply the first amount of nitrogen to the field portion during the first sub-time period of the second agricultural cycle and (b) to apply the second amount of nitrogen to the field portion during the second sub-time period of the second agricultural cycle.

13. A non-transitory computer-readable storage medium storing instructions that, when executed by a computer system, causes the computer system to perform operations comprising:

receiving data of a crop yield component map that maps, for a field portion in a field, plant part metrics corresponding to harvested plant parts in the field portion and amounts of nitrogen previously applied to the field portion during a first agricultural cycle including sprouting and harvesting of a crop in the field;

determining, based on the data of the crop yield component map, a first amount of nitrogen to apply to the field portion during a first sub-time period of a second agricultural cycle, wherein the second agricultural cycle occurs after the first agricultural cycle; and determining, based on the data of the crop yield component map, a second amount of nitrogen to apply to the field portion during a second sub-time period of the second agricultural cycle, wherein the second sub-time period occurs after the first sub-time period, wherein the amounts of nitrogen previously applied to the field portion during the first agricultural cycle of the crop yield component map includes:

a third amount of nitrogen previously applied to the field portion by a first farming machine during a first sub-time period of the first agricultural cycle, wherein the first sub-time period of the first agricultural cycle occurred before sprouting of the crop in the field; and a fourth amount of nitrogen previously applied to the field portion by a second farming machine during a second sub-time period of the first agricultural cycle that occurred subsequent to the first sub-time period, wherein the second sub-time period of the first agricultural cycle occurred after sprouting and before harvesting of the crop in the field.

14. The non-transitory computer-readable storage medium of claim 13, wherein the first amount of nitrogen is determined based on (a) a first metric of the plant part metrics and (b) the third amount of nitrogen.

15. The non-transitory computer-readable storage medium of claim 14, wherein the second amount of nitrogen is determined based on (a) a second metric of the plant part metrics and (b) the fourth amount of nitrogen.

16. The non-transitory computer-readable storage medium of claim 15, wherein:

the crop is corn;

the first metric is the average number of kernels on a cob; and the second metric is the average weight or size of each kernel.

* * * * *